US012031217B2

United States Patent
Nishikawa et al.

(10) Patent No.: US 12,031,217 B2
(45) Date of Patent: Jul. 9, 2024

(54) METHOD OF PRODUCING THIN PLATE-SHAPED GRAPHITE PRODUCT, FLAKY GRAPHITE, AND METHOD OF PRODUCING FLAKY GRAPHITE

(71) Applicants: KANEKA CORPORATION, Osaka (JP); NiSiNa materials Co. Ltd., Okayama (JP)

(72) Inventors: Yasushi Nishikawa, Osaka (JP); Yuta Nishina, Okayama (JP)

(73) Assignees: KANEKA CORPORATION, Osaka (JP); NiSiNa Materials Co. Ltd., Okayama (JP)

( * ) Notice: Subject to any disclaimer, the term of this patent is extended or adjusted under 35 U.S.C. 154(b) by 381 days.

(21) Appl. No.: 17/348,970

(22) Filed: Jun. 16, 2021

(65) Prior Publication Data

US 2021/0309524 A1  Oct. 7, 2021

Related U.S. Application Data

(63) Continuation of application No. PCT/JP2019/042922, filed on Oct. 31, 2019.

(30) Foreign Application Priority Data

Dec. 19, 2018 (JP) ................. 2018-237214

(51) Int. Cl.
  *C25B 1/135* (2021.01)
  *C01B 32/22* (2017.01)
  *C25B 11/043* (2021.01)

(52) U.S. Cl.
  CPC .............. *C25B 1/135* (2021.01); *C01B 32/22* (2017.08); *C25B 11/043* (2021.01);
  (Continued)

(58) Field of Classification Search
  CPC ................................. C25B 1/135; C25B 1/00
  See application file for complete search history.

(56) References Cited

U.S. PATENT DOCUMENTS

2013/0065034 A1   3/2013   Muramatsu
2013/0237723 A1   9/2013   Zhou et al.
2016/0298244 A1   10/2016  Abdelkader et al.

FOREIGN PATENT DOCUMENTS

CN   104264179 B   *   6/2016   ............... C25B 1/00
JP   2012-131691 A       7/2012
(Continued)

OTHER PUBLICATIONS

International Search Report issued in corresponding International Application No. PCT/JP2019/042922 dated Jan. 21, 2020 (7 pages).
(Continued)

*Primary Examiner* — Nicholas A Smith
(74) *Attorney, Agent, or Firm* — Osha Bergman Watanabe & Burton LLP

(57) ABSTRACT

A thin plate-shaped graphite product is produced by applying a current to an electrochemical reaction system including a graphite-containing anode, a cathode optionally containing graphite, and an electrolyte solution containing tetrafluoroboric acid or hexafluorophosphoric acid as an electrolyte. Flaky graphite is produced by subjecting the thin plate-shaped graphite product to delamination.

16 Claims, 16 Drawing Sheets

(52) U.S. Cl.
CPC ...... *C01P 2002/72* (2013.01); *C01P 2002/82* (2013.01); *C01P 2002/85* (2013.01); *C01P 2004/03* (2013.01); *C01P 2004/04* (2013.01); *C01P 2006/40* (2013.01); *C01P 2006/80* (2013.01)

(56) References Cited

FOREIGN PATENT DOCUMENTS

| | | |
|---|---|---|
| JP | 2014-504248 A | 2/2014 |
| JP | 2014-203545 A | 10/2014 |
| JP | 2017-502168 A | 1/2017 |
| JP | 2018-76196 A | 5/2018 |
| WO | 2012/108371 A1 | 8/2012 |

OTHER PUBLICATIONS

Written Opinion of the International Searching Authority issued in corresponding International Application No. PCT/JP2019/042922 dated Jan. 21, 2020 (5 pages).

Jiong Lu et al., "One-Pot Synthesis of Fluorescent Carbon Nanoribbons, Nanoparticles, and Graphene by the Exfoliation of Graphite in Ionic Liquids"; American Chemical Society NANO, vol. 3, No. 8, pp. 2367-2375; Published Aug. 5, 2009 (9 pages).

K. S. Novoselov et al., "Electric Field Effect in Atomically Thin Carbon Films"; Science, vol. 306, pp. 666-669; Oct. 22, 2004 (5 pages).

Umar Khan et al., "High-Conventntion Solvent Exfoliation of Graphene"; Small, vol. 6, No. 7, pp. 864-871; 2010 (9 pages).

William S. Hummers, Jr. et al., "Preparation of Graphite Oxide"; Journal of the American Chemical Society, pp. 1339; Mar. 20, 1958 (2 pages).

C.T.J. Low et al., "Electrochemical approaches to the production of graphene flakes and their potential applications"; CARBON, No. 54, pp. 1-21; 2013 (21 pages).

Songfeng Pei et al., "Green synthesis of graphene oxide by seconds timescale water electrolytic oxidation"; Nature Communications vol. 9, No. 145; pp. 1-9; 2018 (9 pages).

Na Liu et al., "One-Step Ionic-Liquid-Assisted Electrochemical Synthesis of Ionic-Liquid-Functionalized Graphene Sheets Directly from Graphene"; Advanced Functional Materials, vol. 18, No. 10, pp. 1518-1525; 2008 (9 pages).

Fu-Gang Zhao et al., "Fluorinated graphene: facile solution preparation and tailorable properties by fluorine-content tuning"; Journal of Materials Chemistry A, 2; pp. 8782-8789; 2014 (8 pages).

* cited by examiner

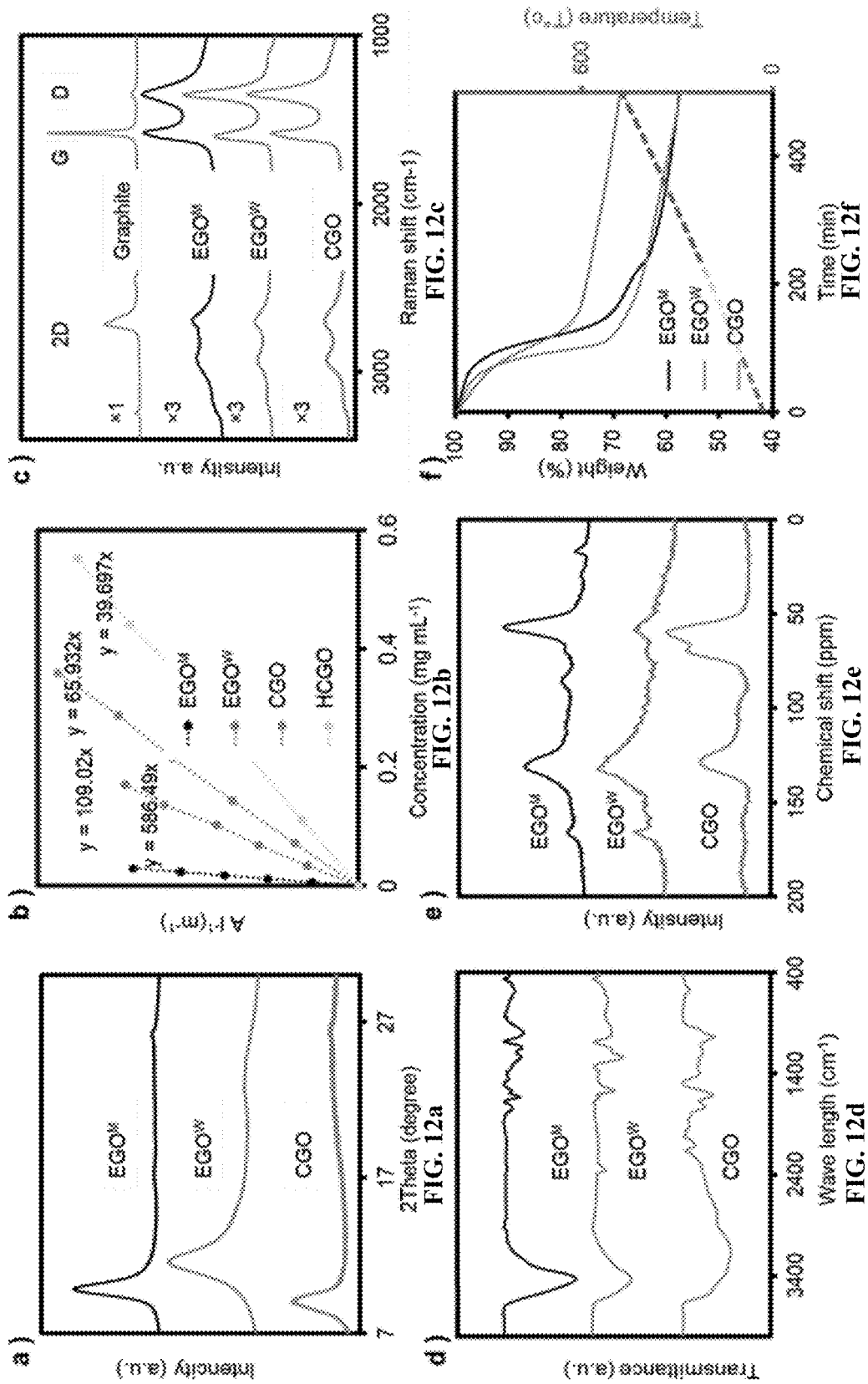

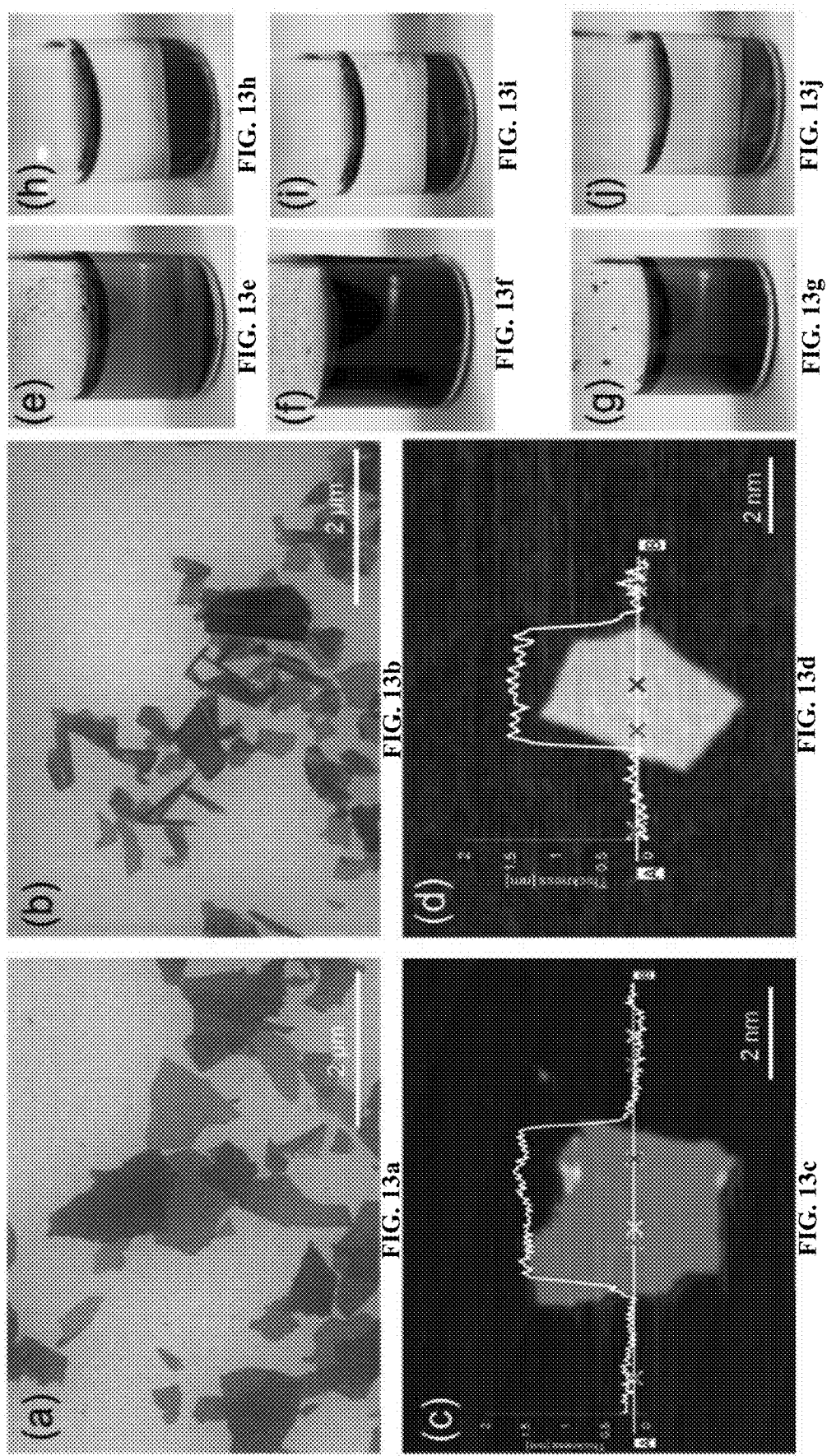

METHOD OF PRODUCING THIN PLATE-SHAPED GRAPHITE PRODUCT, FLAKY GRAPHITE, AND METHOD OF PRODUCING FLAKY GRAPHITE

TECHNICAL FIELD

One or more embodiments of the present invention relate to a method of producing a thin plate-shaped graphite product, flaky graphite, and a method of producing the flaky graphite.

BACKGROUND

As used herein, the term "graphene" refers to a one-atom-thick sheet-shaped material composed of $sp^2$-bonded carbon atoms. The term "thin plate-shaped graphite product" refers to a product which results from insertion of an interlayer material between the layers of raw graphite having a layered structure and in which the interlayer distance (the graphene-to-graphene distance) is greater than in the raw graphite. The term "flaky graphite" refers to graphite particles each of which is a stack of graphene layers resulting from delamination of the thin plate-shaped graphite product and in which the number of the stacked graphene layers is smaller than in the raw graphite.

Graphene is a unique material which by itself has various advantageous properties such as high carrier mobility, high thermal conductivity, and high transparency. Additionally, the graphene is in the form of an ultimately thin nanosheet and allows for easy increase in the area of a device. Moreover, the graphene is superior in thermal and chemical stability. For these reasons, the graphene is a nanocarbon material promising for use as a material for various advanced industrial fields such as electronics.

Graphite is a multilayer material composed of a large number of stacked graphene layers and is abundant on earth. Thus, graphite has been considered a suitable raw material for graphene production, and various attempts have been proposed to delaminate the multilayer material and thereby produce graphene or flaky graphite having a significantly lower number of stacked graphene layers than graphite.

Primary examples of known methods for graphite delamination include: a method in which a mechanical or physical external force is applied to graphite; a method in which graphite is chemically modified with an oxidant and then the chemically modified graphite is delaminated; and an electrochemical method in which graphite used in the form of a working electrode is immersed in an electrolyte solution, a current is applied to intercalate electrolyte ions between the layers constituting the graphite and thereby obtain a thin plate-shaped graphite product, and then the obtained product is delaminated.

Typical examples of the method based on application of a mechanical or physical external force to graphite include a method in which graphite is exfoliated with an adhesive tape (see Non Patent Literature 1) and a method in which graphite is subjected to ultrasonication for a long period of time (see Non Patent Literature 2). These methods have the disadvantages of low ease of handling, low production yield, and low energy efficiency, and thus are unsuitable for large-scale manufacturing.

The method involving chemical modification of graphite is widely known as a method for producing graphene oxide. However, this method requires the use of a large amount of strong oxidant or deleterious substance in the process of graphite delamination. As such, this method inevitably poses quality-related problems such as a defect in the chemical structure of the resulting product. There are also disadvantages such as the risk of explosion of the chemical substance used and the need for troublesome removal of the substance from the resulting product and for cumbersome waste treatment, and these disadvantages are an obstacle to achieving large-scale manufacturing of graphene oxide (see Non Patent Literature 3).

The approach which consists of electrochemical intercalation of electrolyte ions between the graphite-constituting layers followed by delamination is free from the need to use any oxidant or reductant. This approach is adapted to achieve graphite delamination by the use of electrical energy which is easily controllable and under mild reaction conditions, and has the potential of being used as a process for large-scale manufacturing.

In the context of this electrochemical method, many attempts have been made using graphite in the form of a working electrode. The most widely known of such attempts is one in which an aqueous solution of an acid substance such as sulfuric acid, nitric acid, or perchloric acid is used as an electrolyte solution, a current is applied to intercalate the acid substance between the layers constituting the graphite forming the working electrode (anode), and the intercalation is followed by delamination (see Non Patent Literature 4). Among the acid substances as mentioned above, sulfuric acid is frequently used as the electrolyte because it is easily available and readily forms an interlayer compound with graphite.

In the conventionally known electrochemical methods, however, the process of delamination is likely to cause a structural defect of the resulting product. Further, the conventional methods suffer from destruction or loss of the graphite structure which is caused by generation of electrolyte-derived decomposition gas, and this poses an obstacle to extending the range of applications of the conventional methods. There are also problems due to the occurrence of an undesired side reaction such as oxidation of water.

With the goal of avoiding the above-mentioned problems, attempts have been made to allow the intercalation to proceed under as mild conditions as possible (see Patent Literature 1). However, rendering the intercalation conditions mild inevitably entails an increase in the time required for the electrochemical process. In addition, an electrolysis device capable of complex potential control is needed. Thus, the method employing mild intercalation conditions has insufficient production efficiency for large-scale application and is unsatisfactory in terms of cost.

An example has been reported in which short-time electrolysis is allegedly attempted. According to this example, graphene oxide can allegedly be synthesized using a 50% aqueous sulfuric acid solution as an electrolyte solution (see Non Patent Literature 5). However, this method involves the step of converting raw graphite to expanded graphite using concentrated sulfuric acid prior to the oxidation step, and the conversion step requires a longer time than the oxidation step. That is, this method must employ a cumbersome two-stage process and is therefore far from sophisticated.

There are also attempts using a non-aqueous electrolyte in order to avoid the disadvantage of the above-described electrochemical process performed in an aqueous system (see Non Patent Literature 6). In particular, the use of ionic liquids as electrolytes has been actively investigated in recent years. However, ionic liquids themselves are very expensive, and thus their use is economically unsuitable for large-scale manufacturing.

Fluorinated graphene oxide is produced typically by fluorination of graphene oxide resulting from chemical oxidation of graphite. The chemical oxidation involves using a large amount of chemical oxidant such as concentrated sulfuric acid or potassium permanganate (see (Patent Literatures 2 and 3 and Non Patent Literature 7). For this reason, the resulting graphene oxide contains impurities derived from the chemical oxidant, such as heavy metal components or sulfur components. Thus, in principle, fluorinated graphene oxide produced by the above method cannot avoid being polluted with impurities including manganese components and sulfur components. Patent Literature 3 indicates that fluorinated graphene oxide formed in an example described in this literature contains a non-negligible amount of sulfur components.

It is well-known that graphene oxide is an easily reducible compound. To be specific, graphene oxide can be easily converted to reduced graphene oxide (rGO) by heating or the action of a reductant. Thus, fluorination of graphene oxide could cause loss of an excess amount of oxygen-containing functional groups such as hydroxy groups present in the intrinsic skeleton of graphene oxide. Patent Literature 3 proves that fluorination of graphene oxide results in loss of the hydroxy groups of graphene oxide.

Reduced graphene oxide (rGO) tends to be aggregated into a multilayer structure.

Given this tendency, it is easy to infer that graphene oxide used as the raw material loses its monolayer form and becomes multilayered during the post-oxidation fluorination and the subsequent isolation step. This inference is supported by the fact that none of Patent Literatures 2 and 3 and Non Patent Literature 7 make any mention of retention of the monolayer form in the resulting fluorinated graphene oxide.

PATENT LITERATURE

PTL 1: Japanese Laid-Open Patent Application Publication No. 2012-131691
PTL 2: Japanese Laid-Open Patent Application Publication (Translation of PCT Application) No. 2014-504248
PTL 3: Japanese Laid-Open Patent Application Publication No. 2018-76196

Non-Patent Literature

NPL 1: Science, 306 (5696), 666-9 (2004).
NPL 2: Small, 6(7), 864-71 (2010).
NPL 3: J. Am. Chem. Soc., 80, 1339 (1958).
NPL 4: CARBON, 54, 1-21 (2013).
NPL 5: Nature Commun., 9:145 (2018).
NPL 6: Adv. Funct. Mater., 18(10), 1518-25 (2008).
NPL 7: J. Mater. Chem. A, 2, 8782-8789 (2014).

As described above, large-scale and economically-efficient production of flaky graphite remains difficult although many reports have been made of methods for producing flaky graphite by delamination of graphite. To use flaky graphite as an industrial material, it is crucial to establish a production technique that causes less environmental load during production and that can be carried out at a large scale and in an economically efficient way.

SUMMARY

In view of the above circumstances, one or more embodiments of the present invention aim to provide a method for efficiently producing a high-quality thin plate-shaped graphite product or high-quality flaky graphite.

In an effort to solve the above-described problems, the present inventors have considered that the quickest way to the practical use of the flaky graphite production technology is to improve the electrochemical process into a sophisticated technique. The inventors have conducted intensive studies based on the belief that the key to reaching their goal is to discover an electrolyte serving as a superior graphite-intercalating agent.

As a result, the inventors have found that the use of tetrafluoroboric acid or hexafluorophosphoric acid as an electrolyte can offer an unprecedentedly effective graphite-intercalating agent, and have completed one or more embodiments of the present invention based on this finding.

Specifically, a first aspect of one or more embodiments of the present invention relates to a method of producing a thin plate-shaped graphite product, the method including applying a current to an electrochemical reaction system, wherein the electrochemical reaction system includes: a graphite-containing anode; a cathode optionally containing graphite; and an electrolyte solution containing tetrafluoroboric acid or hexafluorophosphoric acid as an electrolyte.

In the first aspect of one or more embodiments of the present invention, graphite is used in the anode, and the electrolyte solution contains tetrafluoroboric acid or hexafluorophosphoric acid as the electrolyte. By applying a current to such a system, the graphite can be converted to a thin plate-shaped graphite product in a single stage. The "thin plate-shaped graphite product" of the present disclosure refers to a product obtained through the electrochemical step (namely, an electrolyzed portion of the anodic graphite) and retaining the form of the anode as a whole without peeling or separation into the electrolyte solution. According to one or more embodiments of the first aspect of the present invention, such a thin plate-shaped graphite product can be suitably produced, with the distribution of graphene layer stacking controlled in the order of nanometers.

Further, according to one or more embodiments of the first aspect of the present invention, the thin plate-shaped graphite product of high quality can be very quickly produced in a high yield simply by carrying out the electrochemical step without having to perform a cumbersome additional process such as filtration.

With the invention described above, the electrolyte ions can be intercalated between the graphene layers constituting the anodic graphite very uniformly and quickly. Thus, the resulting thin plate-shaped graphite product has little defect in its carbon skeleton, and the number of remaining graphene layers with an insufficient degree of intercalation can be minimized. At the same time, the efficiency of the production of the thin plate-shaped graphite product can be drastically increased in various respects such as quality, current efficiency, time efficiency, yield, and small amount of loss including waste.

In one or more embodiments of the first aspect of the present invention, tetrafluoroboric acid anions or hexafluorophosphoric acid anions can be intercalated between layers constituting graphite of the anode to obtain the thin plate-shaped graphite product. The thin plate-shaped graphite product thus obtained contains tetrafluoroboric acid anions or hexafluorophosphoric acid anions intercalated between the graphite-constituting layers, and thus has an increased distance between the graphene layers constituting the graphite and further has an oxidized carbon skeleton. Such a product should be considered a novel expanded graphite product.

In one or more embodiments of the first aspect of the present invention, the graphite-containing anode may be an anode made by thermal treatment of a polycondensation polymer compound and an anode made by thermal treatment of an aromatic polyimide. The graphite of such an anode has a structure in which planar graphite crystals are stacked in layers. The graphite with this structure is preferred because it allows the intercalation of tetrafluoroboric acid anions or hexafluorophosphoric acid anions between the graphite-constituting layers to proceed very easily and is so resistant to intercalation-induced peeling or separation of tiny pieces from the graphite that the resulting product is likely to retain the form of the anode as a whole. The use of such an anode can enhance the benefits of one or more embodiments of the first aspect of the present invention.

In one or more embodiments of the first aspect of the present invention, the graphite-containing anode may be an anode made by high-pressure pressing of expanded graphite resulting from immersion of natural graphite in a strong acid and subsequent heating treatment of the natural graphite. Also with the use of such an anode, the benefits of one or more embodiments of the first aspect of the present invention can be obtained.

In one or more embodiments of the first aspect of the present invention, the electrolyte solution may contain a polar protic solvent or a polar aprotic solvent and may contain water and a polar aprotic solvent. Tetrafluoroboric acid anions or hexafluorophosphoric acid anions are considered to have a relatively high lipophilicity, and the above solvents can be expected to support the penetration of the lipophilic anions between the graphite-constituting layers. Additionally, the increased choices for the solvent of the electrolyte solution lead to widening the range of electrolysis conditions advantageous for efficiently producing the thin plate-shaped graphite product by one or more embodiments of the present invention.

In one or more embodiments of the first aspect of the present invention, the electrolyte solution may contain a solvent consisting of water. Alternatively, the electrolyte solution may contain water and a polar protic solvent other than water. The polar protic solvent other than water may be an alcoholic solvent.

The present inventors have further found that when the graphite used to form the anode is graphite obtained by thermal treatment of a polycondensation polymer compound or graphite obtained by pressing of expanded graphite resulting from immersion of natural graphite in a strong acid and subsequent heating treatment of the natural graphite, a thin plate-shaped graphite product or flaky graphite can be efficiently produced even with the use of sulfuric acid or nitric acid as an electrolyte.

Specifically, one or more embodiments of a second aspect of the present invention relates to a method of producing a thin plate-shaped graphite product, the method including applying a current to an electrochemical reaction system, wherein the electrochemical reaction system includes: an anode containing graphite obtained by thermal treatment of a polycondensation polymer compound or graphite obtained by pressing of expanded graphite resulting from immersion of natural graphite in a strong acid and subsequent heating treatment of the natural graphite; a cathode optionally containing graphite; and an electrolyte solution containing sulfuric acid or nitric acid as an electrolyte. As in one or more embodiments of the first aspect of the present invention, graphite can be converted to a thin plate-shaped graphite product in a single stage, and the thin plate-shaped graphite product of high quality can be very quickly produced in a high yield without having to perform a cumbersome additional process such as filtration.

One or more embodiments of a third aspect of the present invention relate to a method of producing flaky graphite, the method including: obtaining a thin plate-shaped graphite product by the method according to one or more embodiments of the first or second aspect of the present invention; and subjecting the thin plate-shaped graphite product to delamination to obtain the flaky graphite. With this method, a thin plate-shaped graphite product produced by one or more embodiments of the first or second aspect of the present invention can be flaked to produce flaky graphite.

In one or more embodiments of the third aspect of the present invention, the delamination may be delamination by ultrasonication, mechanical delamination, or delamination by heating. In this case, flaking of the thin plate-shaped graphite product can be more reliably accomplished.

According to one or more embodiments of the third aspect of the present invention, flaky graphite having a thickness of 100 nm or less can be produced.

The flaky graphite producible by one or more embodiments of the third aspect of the present invention may contain oxygen and has a carbon/oxygen mass ratio (C/O) of 20 or less. The flaky graphite may further contain fluorine.

According to one or more embodiments of the third aspect of the present invention, flaky graphite containing fluorine can be produced from graphite without the use of any chemical oxidant. Thus, one or more embodiments of the third aspect of the present invention make it possible to produce novel fluorine-containing flaky graphite substantially free of heavy metal components (in particular, manganese components) and sulfur components which could be derived from chemical oxidants.

Additionally, one or more embodiments of the third aspect of the present invention eliminate the need for a graphene oxide isolation step essential for conventional techniques to yield fluorinated graphene oxide, and enables production of fluorine-containing flaky graphite without such an isolation step.

Further, one or more embodiments of the third aspect of the present invention, which do not involve any process for isolating graphene oxide and fluorinating the isolated graphene oxide, are free from risk of graphene oxide reduction which could occur during such a process. Thus, fluorine-containing flaky graphite can be produced in which oxygen-containing functional groups such as hydroxy groups of graphene oxide remain intact and therefore in which the monolayer form is retained.

Still further, one or more embodiments of the third aspect of the present invention can provide a flaky graphite production method that not only offers the product quality-related advantages described above but also exhibits drastically increased production efficiency in terms of current efficiency, time efficiency, yield, and small amount of loss including waste.

One or more embodiments of a fourth aspect of the present invention relate to novel fluorine-containing flaky graphite producible by one or more embodiments of the third aspect of the present invention and particularly relate to flaky graphite containing fluorine and oxygen, having a manganese content of 0.002 mass % or less, and having a sulfur content of 0.1 mass % or less.

In one or more embodiments of the fourth aspect of the present invention, the flaky graphite may have a fluorine content of 0.5 to 40 mass %, a carbon content of 40 to 80 mass %, and an oxygen content of 1.0 to 50 mass %.

One or more embodiments of a fifth aspect of the present invention relate to flaky graphite containing oxygen, the flaky graphite having a carbon/oxygen mass ratio (C/O) of 0.8 to 5, wherein Fourier transform infrared spectroscopy (FT-IR) of the flaky graphite gives a chart in which a peak at a wavelength of around 3420 cm$^{-1}$ has a width at half maximum of 1000 cm$^{-1}$ or less.

In one or more embodiments of the fifth aspect of the present invention, Fourier transform infrared spectroscopy of the flaky graphite may give a chart in which the ratio of the height of a peak at a wavelength of around 1720 to 1740 cm$^{-1}$ to the height of a peak at a wavelength of around 1590 to 1620 cm$^{-1}$ is less than 0.3, and X-ray photoelectron spectroscopy (XPS) of the flaky graphite may give a chart in which the ratio of the height of a peak at a binding energy of around 288 to 289 eV to the height of a peak at a binding energy of around 284 to 285 eV is less than 0.05.

In one or more embodiments of the fifth aspect of the present invention, Fourier transform infrared spectroscopy of the flaky graphite may give a chart in which the ratio of the height of a peak at a wavelength of around 1720 to 1740 cm$^{-1}$ to the height of a peak at a wavelength of around 1590 to 1620 cm$^{-1}$ is 0.3 or more, and X-ray photoelectron spectroscopy (XPS) of the flaky graphite may give a chart in which the ratio of the height of a peak at a binding energy of around 288 to 289 eV to the height of a peak at a binding energy of around 284 to 285 eV is 0.05 or more.

One or more embodiments of a sixth aspect of the present invention relates to flaky graphite containing oxygen, the flaky graphite having a carbon/oxygen mass ratio (C/O) of 0.8 to 5, wherein solid $^{13}$C NMR of the flaky graphite gives a chart in which the ratio of the height of a peak at a chemical shift of around 70 ppm to the height of a peak at a chemical shift of around 130 ppm is 1.0 or less.

In one or more embodiments of the sixth aspect of the present invention, solid $^{13}$C NMR of the flaky graphite may give a chart in which the ratio of the height of a peak at a chemical shift of around 60 ppm to the height of a peak at a chemical shift of around 70 ppm is less than 2.2. In one or more embodiments of the sixth aspect, solid $^{13}$C NMR of the flaky graphite may give a chart in which the ratio of the height of a peak at a chemical shift of around 60 ppm to the height of a peak at a chemical shift of around 70 ppm is 2.2 or more.

One or more embodiments of the present invention make it possible to efficiently produce a high-quality thin plate-shaped graphite product or high-quality flaky graphite.

BRIEF DESCRIPTION OF DRAWINGS

FIG. 12a shows XRD patterns of EGO$^M$, EGO$^W$, and CGO, FIG. 12b shows Lambert-Beer coefficients of EGO$^M$, EGO$^W$, CGO, and highly oxidized CGO (HCGO), FIG. 12c shows results of Raman spectroscopy of graphite, EGO$^M$, EGO$^W$, and CGO, FIG. 12d shows results of FT-IR analysis of EGO$^M$, EGO$^W$, and CGO, FIG. 12e shows results of solid $^{13}$C NMR of EGO$^M$, EGO$^W$, and CGO, and FIG. 12f shows results of TGA-MS of EGO$^M$, EGO$^W$, and CGO.

FIG. 13a is a SEM image of EGO$^W$, FIG. 13b is a SEM image of EGO$^M$, FIG. 13c is an AFM image of EGO$^W$, FIG. 13d is an AFM image of EGO$^M$, FIG. 13e, FIG. 13f, and FIG. 13g are respectively photographs of CGO, EGO$^W$, and EGO$^M$ taken two months after CGO, EGO$^W$, and EGO were each dispersed in water, and FIG. 13h, FIG. 13i, and FIG. 13j are respectively photographs of CGO, EGO$^W$, and EGO$^M$ taken one week after CGO, EGO$^W$, and EGO were each dispersed in methanol.

DETAILED DESCRIPTION OF THE EMBODIMENTS

Figure 1:
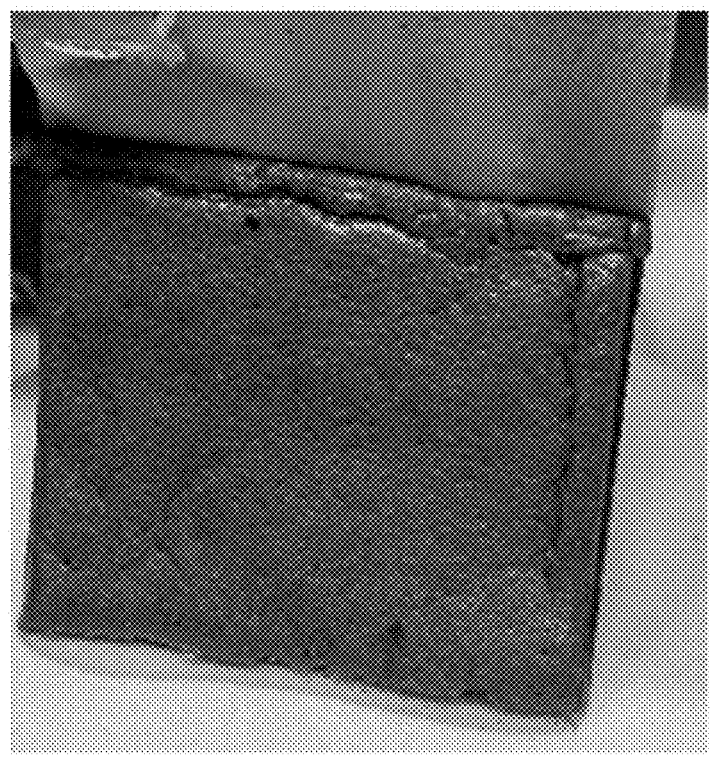
FIG. 1 is a photograph showing the exterior appearance of an as-reacted anode, namely a thin plate-shaped graphite product, in Example 1.

Hereinafter, one or more embodiments of the present invention will be described in detail.

In one or more embodiments of the present invention, an electrochemical reaction using a specified electrolyte is carried out, and thereby graphite used in the form of an anode is converted to a thin plate-shaped graphite product.

In one or more embodiments of the present invention, the anode is not limited to a particular material, and may be made of any electrically conductive material containing layered graphite that can form an interlayer compound with (or, in other words, undergo intercalation of) the electrolyte specified in one or more embodiments of the present invention. The anodic material can be selected from a wide range of choices. Examples of the material include natural graphite and synthetic graphite and further include graphite obtained by thermal treatment of a polycondensation polymer compound and highly orientated pyrolytic graphite (HOPG).

Examples of the polycondensation polymer compound include, but are not limited to, aromatic polyimides, aromatic polyamides, polyoxadiazole, and polyparaphenylenevinylene. Among these, aromatic polyimides are preferred.

A specific example of the graphite is one obtained by thermal treatment of an aromatic polyimide. Such graphite has a structure in which planar graphite crystals are stacked in layers. The graphite with this structure allows the intercalation of tetrafluoroboric acid anions or hexafluorophosphoric acid anions to proceed very easily and is so resistant to intercalation-induced peeling or separation of tiny pieces from the graphite that the resulting product is likely to retain the form of the anode as a whole. Thus, with the use of the above graphite, a higher-quality thin plate-shaped graphite product or flaky graphite can be produced more efficiently.

The anode may be one formed by high-pressure pressing of expanded graphite resulting from immersion of natural graphite in a strong acid such as concentrated sulfuric acid or nitric acid and the subsequent heating treatment of the natural graphite in an expanding furnace. Also with the use of such an anode, a higher-quality thin plate-shaped graphite product or flaky graphite can be produced more efficiently.

The anode is not limited to a particular form, and a suitable form of the anode can be selected as desired from a wide range of choices. The anode may be, for example, in the form of a rod, plate, cake, sheet, foil, or roll.

The cathode used in the method of one or more embodiments of the present invention for producing a thin plate-shaped graphite product is an electrode paired with the anode described above, but is not directly involved in the production of the thin plate-shaped graphite product. Thus, the cathode is not limited to a particular material, and may be made of any material having the function of donating electrons to cations resulting from the anodic reaction and able to contribute to establishment of an electrochemically stable system. The cathodic material can be selected as desired from a wide range of choices. For example, the material can be selected from metal materials such as platinum, stainless steel, copper, zinc, and lead and carbon materials such as graphite. The form of the cathode can be selected as desired, and the cathode may be in the form of a wire, plate, or mesh (net).

When the cathodic reaction involves gas generation, the area of the cathode may be increased as much as possible for purposes such as to prevent decrease in efficiency of the cathodic reaction and avoid unnecessary increase in electrical resistance of the electrolysis system.

In the production method of one or more embodiments of the present invention, an ion-exchange membrane or a spacer may be placed between the anode and cathode to prevent the occurrence of an undesired reaction at the anode and/or cathode or prevent a short circuit between the two electrodes.

The electrode system in the production method of one or more embodiments of the present invention may consist of the anode and cathode described above. Alternatively, a reference electrode may be used in addition to the anode and cathode to accomplish more precise potential control. The reference electrode can be a commonly used electrode such as an Ag/AgCl electrode.

In one or more embodiments of the present invention, tetrafluoroboric acid or hexafluorophosphoric acid is used as the electrolyte. The two acids may be used together. Anions of these acids can be intercalated very quickly between the layers constituting graphite. The use of the acids therefore ensures very high current efficiency and time efficiency of the electrochemical reaction, leading to efficient production of a high-quality thin plate-shaped graphite product. Tetrafluoroboric acid and hexafluorophosphoric acid are available in pure form. Alternatively, a commercially-available 40 to 50% aqueous solution of tetrafluoroboric acid or hexafluorophosphoric acid may be used. The solution may, if necessary, be diluted by adding an appropriate solvent.

The electrolyte solution contains the electrolyte and a solvent in which the electrolyte is dissolved. The solvent used can be selected as desired from solvents that are miscible with tetrafluoroboric acid, hexafluorophosphoric acid, or aqueous solutions of these acids and that are electrochemically stable during production of the thin plate-shaped graphite product.

Solvents may include: polar protic solvents such as water and lower alcohols such as methanol, ethanol, and propanol; and polar aprotic solvents such as acetonitrile, dimethylformamide, dimethoxyethane, dimethyl carbonate, propylene carbonate, and dimethyl sulfoxide. One of these solvents may be used alone, or two or more thereof may be used in combination.

The electrolysis solution may contain water as the solvent. Water may be used alone as the solvent. Alternatively, the solvent may contain water and a polar protic solvent other than water or contain water and a polar aprotic solvent. Flaky graphite obtained using a water-containing solvent has the advantage of having high affinity for water and being highly dispersible in water. Tetrafluoroboric acid anions and hexafluorophosphoric acid anions are considered to have a relatively high lipophilicity, and the combined use of water with a polar protic solvent other than water or a polar aprotic solvent can be expected to support the penetration of the lipophilic anions between the graphite-constituting layers. Additionally, the increased choices for the solvent of the electrolyte solution lead to widening the range of electrolysis conditions advantageous for efficiently producing the thin plate-shaped graphite product.

When an alcoholic solvent, which is a polar protic solvent, is used as the solvent of the electrolyte solution, the resulting thin plate-shaped graphite product or flaky graphite can have alkoxy and/or alkyl groups derived from the alcoholic solvent used. Flaky graphite obtained using an alcoholic solvent has the advantage of having high affinity for the alcoholic solvent and being highly dispersible in the alcoholic solvent.

The concentration of the electrolyte in the electrolyte solution is such that the electrical resistance of the electrochemical reaction system is sufficiently low and that tetrafluoroboric acid anions or hexafluorophosphoric acid anions are quickly supplied to the anodic graphite to obtain the thin plate-shaped graphite product. The concentration of the electrolyte may be from 1.0 to 50 mass % or from 5.0 to 50 mass %.

In one or more embodiments of the present invention, a DC voltage is applied to an electrochemical reaction system made up of the anode, cathode, and electrolyte solution which have been described above. The applied voltage is such as to achieve at least a potential required for insertion of tetrafluoroboric acid anions or hexafluorophosphoric acid anions between the graphite-constituting layers of the anode. An overvoltage may be applied to quickly obtain the thin plate-shaped graphite product. In practice, the applied voltage may be set so as to overcome voltage-decreasing factors governing the electrical resistance of the electrolysis system, such as the concentration of the electrolyte, the solvent composition of the electrolyte solution, the distance between the anode and cathode, and the electrolysis temperature. To be specific, the applied voltage may be in the range of 1.5 to 50 V or in the range of 2.0 to 25 V.

The density of the current supplied to the anode is controlled depending on the applied voltage and the surface area of the electrode. In one or more embodiments of the present invention which uses tetrafluoroboric acid or hexafluorophosphoric acid as the electrolyte, anions of the acid can be intercalated between the graphite-constituting layers very quickly, and the distances between the graphene layers can be increased uniformly. Thus, the current density can be set in a wide range from very low to high values, and the thin plate-shaped graphite product can be obtained regardless of the magnitude of the current density. The current density may be from 1 to 2,000 mA/cm$^2$ or from 10 to 1,000 mA/cm$^2$.

In one or more embodiments of the present invention, it is preferable that the current supplied to the electrochemical reaction system be set to a constant value. In this case, the constant current value may be chosen such that the current density falls within the range described above. The range of the voltage applied to the electrochemical reaction system in this case is the same as the applied voltage range previously described, although the applied voltage may vary depending on the degree of reaction progress or the resistance value of the system.

The quantity of electricity (F/mol, F: Faraday constant) supplied to the electrochemical reaction system may be 0.2 F/mol or more, from 0.8 to 3.0 F/mol, or from 1.0 to 2.0 F/mol based on the number of moles of the carbon atoms of the graphite subjected to the electrolysis reaction. The supply of this quantity of electricity leads to effective production of the thin plate-shaped graphite product or flaky graphite.

The temperature of the electrolyte solution at the time of voltage application to the electrochemical reaction system may vary depending on the type of the solvent in which the electrolyte is dissolved or on the concentration of the electrolyte solution. In effect, however, the lower limit of the electrolyte solution temperature at the time of voltage application is a temperature at or above which the electrolyte solution is not frozen, and the upper limit is the boiling point of the electrolyte solution. The voltage application may be performed with the temperature of the electrolyte solution in the range of 0 to 100° C. The voltage application may be performed with the temperature of the electrolyte solution in the range of 0 to 80° C.

In one or more embodiments of the present invention, in theory, tetrafluoroboric acid or hexafluorophosphoric acid used as the electrolyte is not consumed in the reaction. Thus, the electrolyte solution used for production of the thin plate-shaped graphite product may be reused repeatedly. In this case, the reaction system may, if necessary, be supplemented with the electrolyte to compensate for a decrease in the electrolyte amount which is due to, for example, adhesion of the electrolyte to the thin plate-shaped graphite product taken out of the electrolyte solution.

In one or more embodiments of the present invention, the electrolyte solution containing tetrafluoroboric acid or hexafluorophosphoric acid is trapped in and adheres to the thin plate-shaped graphite product that has just undergone the reaction. The electrolyte solution components carried on the thin plate-shaped graphite product can be recovered. Such recovery can become more effective as the scale of production of the thin plate-shaped graphite product increases. Specific examples of the recovery method include a method in which the thin plate-shaped graphite product carrying the electrolyte solution is subjected to the action of a centrifuge, a method in which the thin plate-shaped graphite product is subjected to pressure filtration, and a method in which the electrolyte solution is continuously collected on a belt press.

After the thin plate-shaped graphite product is taken out of the electrolyte solution, the electrolyte solution components can, regardless of whether the above recovery process is performed, be removed from the product by washing the product with an excess amount of deionized water until the washings become neutral.

The thin plate-shaped graphite product obtained through the above steps may remain wet when subjected to the subsequent steps of producing the flaky graphite. Alternatively, the plate-shaped graphite product may, if necessary, be subjected to a drying step and then subjected to the steps of producing the flaky graphite. The drying is not limited to a particular method. For example, the plate-shaped graphite product may be dried by a thermostatic oven or a vacuum dryer at a temperature of 80° C. or lower.

In one or more embodiments of the present invention, as described above, a current is applied to an electrochemical reaction system employing a graphite-containing anode and an electrolyte solution containing tetrafluoroboric acid or hexafluorophosphoric acid as an electrolyte. Upon the current application, tetrafluoroboric acid anions or hexafluorophosphoric acid anions are intercalated between the graphite-constituting layers quickly and uniformly, with the result that a thin plate-shaped graphite product can be obtained in which the distances between the graphene layers constituting the graphite have been uniformly increased.

In the method of one or more embodiments of the present invention for producing a thin plate-shaped graphite product, the anode used may be an anode containing graphite obtained by thermal treatment of a polycondensation polymer compound or graphite obtained by pressing of expanded graphite resulting from immersion of natural graphite in a strong acid and subsequent heating treatment of the natural graphite, and in this case sulfuric acid or nitric acid may be used as the electrolyte. Also in such an embodiment, a high-quality thin plate-shaped graphite product or flaky graphite can be produced efficiently. In this embodiment, an aqueous sulfuric acid solution may be used as the electrolyte solution. The concentration of the aqueous sulfuric acid solution is not limited to a particular range, and may be, for example, from 1 to 60 wt %. The other conditions are as described above for the embodiment in which tetrafluoroboric acid or hexafluorophosphoric acid is used as the electrolyte.

Flaky graphite which may have a thickness of 100 nm or less can be produced by delamination of the thin plate-shaped graphite product obtained by one or more embodiments of the present invention.

Examples of the delamination include, but are not limited to, delamination by ultrasonication, delamination by application of a mechanical delamination force, and delamination by heating. Specific examples of the delamination method include a method consisting of dispersing the thin plate-shaped graphite product in an appropriate amount of deionized water and subjecting the resulting dispersion to the action of an ultrasonicator and a method consisting of processing the thin plate-shaped graphite product with a mixer or a device capable of applying a shear force. The processed product resulting from the delamination may be freeze-dried. Alternatively, the processed product may be subjected to filtration or centrifugation to obtain a cake, and the cake may be subjected to a drying process similar to the above-described drying process for the thin plate-shaped graphite product.

Through the above procedures, flaky graphite having a thickness of 100 nm or less can be effectively produced. The thickness of the flaky graphite may be 50 nm or less or 10 nm or less. The flaky graphite that has a thickness of 1 nm or less is particularly preferred. The average particle size of the flaky graphite can be varied in a range from nanometers to millimeters. The average particle size may be in the range of 30 nm to 1 mm, in the range of 50 nm to 100 µm, or in the range of 100 nm to 50 µm. The flaky graphite obtained may be made of graphene oxide (graphene containing oxygen). In the graphene oxide, the carbon/oxygen mass ratio (C/O) may be 20 or less, 15 or less, 10 or less, 5 or less, or 3 or less. The flaky graphite may be made of fluorinated graphene oxide (graphene containing fluorine and oxygen).

The fluorine-containing flaky graphite, which is suitably produced by one or more embodiments of the present invention, is characterized by having a high purity and a low impurity content which are attributed to the features of the production method of one or more embodiments of the present invention. In particular, the fluorine-containing flaky graphite is marked by low contents of heavy metal and sulfur components. To be specific, the fluorine-containing flaky graphite may have a manganese content of 0.002 mass % or less and a sulfur content of 0.1 mass % or less, or may have a manganese content of 0.001 mass % or less and a sulfur content of 0.01 mass % or less.

Further, the fluorine-containing flaky graphite may have a fluorine content of 0.5 to 40 mass %, a carbon content of 40 to 80 mass %, and an oxygen content of 1.0 to 50 mass %, or may have a fluorine content of 1.0 to 15 mass %, a carbon content of 45 to 75 mass %, and an oxygen content of 15 to 45 mass %.

The oxygen-containing flaky graphite, which is suitably produced by one or more embodiments of the present invention, may have a carbon/oxygen mass ratio (C/O) of 0.8 to 5. Further, Fourier transform infrared spectroscopy (FT-IR) of the oxygen-containing flaky graphite may give a chart in which a peak at a wavelength of around 3420 $cm^{-1}$ has a width at half maximum of 1000 $cm^{-1}$ or less. The width at half maximum may be 700 $cm^{-1}$ or less, 500 $cm^{-1}$ or less, or 400 $cm^{-1}$ or less. The carbon/oxygen mass ratio (C/O) may be in the range of 0.9 to 3, in the range of 0.9 to 2, or in the range of 0.9 to 1.5.

In an embodiment, Fourier transform infrared spectroscopy of the oxygen-containing flaky graphite may give a chart in which the ratio of the height of a peak at a wavelength of around 1720 to 1740 $cm^{-1}$ to the height of a peak at a wavelength of around 1590 to 1620 $cm^{-1}$ is less than 0.3. The peak height ratio may be 0.25 or less or 0.2 or less. In this embodiment, X-ray photoelectron spectroscopy (XPS) of the oxygen-containing flaky graphite may give a chart in which the ratio of the height of a peak at a binding energy of around 288 to 289 eV to the height of a peak at a binding energy of around 284 to 285 eV is less than 0.05. The peak height ratio may be 0.04 or less or 0.03 or less. The flaky graphite according to this embodiment has high affinity for water and is highly dispersible in water. This flaky graphite can be suitably produced when water is used alone as the solvent of the electrolyte solution in the production method of the thin plate-shaped graphite product.

In another embodiment, Fourier transform infrared spectroscopy of the oxygen-containing flaky graphite may give a chart in which the ratio of the height of a peak at a wavelength of around 1720 to 1740 $cm^{-1}$ to the height of a peak at a wavelength of around 1590 to 1620 $cm^{-1}$ is 0.3 or more. The peak height ratio may be 0.4 or more, or 0.5 or more. In this embodiment, X-ray photoelectron spectroscopy (XPS) of the oxygen-containing flaky graphite may give a chart in which the ratio of the height of a peak at a binding energy of around 288 to 289 eV to the height of a peak at a binding energy of around 284 to 285 eV is 0.05 or more. The peak height ratio may be 0.06 or more, or 0.07 or more. The flaky graphite according to this embodiment has high affinity for alcoholic solvents and is highly dispersible in alcoholic solvents. This flaky graphite can be suitably produced when an alcoholic solvent is used as the solvent of the electrolyte solution in the production method of the thin plate-shaped graphite product.

The oxygen-containing flaky graphite, which is suitably produced by one or more embodiments of the present invention, may have a carbon/oxygen mass ratio (C/O) of 0.8 to 5, and solid $^{13}C$ NMR of this flaky graphite may give a chart in which the ratio of the height of a peak at a chemical shift of around 70 ppm to the height of a peak at a chemical shift of around 130 ppm is 1.0 or less. The peak height ratio may be 0.8 or less, 0.6 or less, or 0.5 or less. The carbon/oxygen mass ratio (C/O) may be in the range of 0.9 to 3, in the range of 0.9 to 2, or in the range of 0.9 to 1.5.

In an embodiment, solid $^{13}C$ NMR of the oxygen-containing flaky graphite may give a chart in which the ratio of the height of a peak at a chemical shift of around 60 ppm to the height of a peak at a chemical shift of around 70 ppm is less than 2.2. The peak height ratio may be 1.9 or less, or 1.7 or less. The flaky graphite according to this embodiment has high affinity for water and is highly dispersible in water. This flaky graphite can be suitably produced when water is used alone as the solvent of the electrolyte solution in the production method of the thin plate-shaped graphite product.

In another embodiment, solid $^{13}C$ NMR of the oxygen-containing flaky graphite may give a chart in which the ratio of the height of a peak at a chemical shift of around 60 ppm to the height of a peak at a chemical shift of around 70 ppm is 2.2 or more. The peak height ratio may be 2.5 or more, or 2.8 or more. The flaky graphite according to this embodiment has high affinity for alcoholic solvents and is highly dispersible in alcoholic solvents. This flaky graphite can be suitably produced when an alcoholic solvent is used as the solvent of the electrolyte solution in the production method of the thin plate-shaped graphite product.

EXAMPLES

Hereinafter, one or more embodiments of the present invention will be described in more detail based on examples. It should be noted that the present invention is not limited to the examples given below.

Method of Measuring Carbon/Oxygen Mass Ratio (C/O) of Flaky Graphite

The carbon/oxygen mass ratio (C/O) of the flaky graphite was measured using the principle of energy dispersive X-ray spectrometry (EDX). Specifically, the flaky graphite was formed into dry powder by a given process, and the dry powder was attached evenly over a carbon tape and subjected to the measurement using JSM IT-100 manufactured by JEOL Ltd.

Method of Measuring Average Particle Size and Maximum Particle Size of Flaky Graphite The average particle size and maximum particle size of the flaky graphite were measured using a scanning electron microscope (SEM). Specifically, a diluted dispersion of the flaky graphite was applied to a silicon substrate, and a SEM image of the flaky graphite was obtained using S-5200 manufactured by Hitachi, Ltd. at an accelerating voltage of 30 kV. The average particle size was determined by randomly selecting a given number of (e.g., 200) particles on the SEM image, measuring the particle size of each particle, and dividing the sum of the measured values by the number of the particles. The maximum particle size is the size of the largest particle among the particles observed on the SEM image.

Method of Measuring Minimum Thickness of Flaky Graphite

The minimum thickness of the flaky graphite was measured using an atomic force microscope (AFM). Specifically, a diluted dispersion of the flaky graphite was applied to a mica substrate, and the minimum thickness of the flaky graphite was measured using SPM-9700 HT manufactured by Shimadzu Corporation in a tapping mode.

Method of Measuring Manganese Content and Sulfur Content of Flaky Graphite

The manganese content and sulfur content of the flaky graphite were measured by inductively coupled plasma mass spectrometry (ICP-MS). Specifically, a diluted dispersion of the flaky graphite was analyzed using 7700c manufactured by Agilent Technologies, Inc.

Example 1

A glass reactor was prepared and charged with 100 ml of a 5% aqueous tetrafluoroboric acid solution as the electrolyte solution. A commercially-available graphite foil manufactured by Kaneka Corporation (a foil resulting from thermal graphitization of an aromatic polyimide which is a polycondensation polymer compound) was used as the anode and fixed in such a way that a 15-cm 2 portion (equivalent to 65 mg of graphite) of the foil was immersed in the electrolyte solution. A platinum wire electrode was set as the cathode. The electrodes were connected to a DC power supply, and electrolysis was carried out at room temperature and a constant current of 0.7 A for 10 minutes. In the course of the reaction, the electrolyte solution-immersed portion of the graphite foil used as the anode showed a smooth increase in thickness and a slight degree of surface browning. A photograph of the as-reacted anode is shown in FIG. 1. After the reaction, the anode kept the sheet form intact almost without suffering from peeling or falling off into the electrolyte solution, while the thickness of the electrolyte solution-immersed portion was obviously greater than before the reaction. This indicates that tetrafluoroboric acid anions were quickly intercalated into the graphite foil and consequently a thin plate-shaped graphite product was formed.

Figure 2:
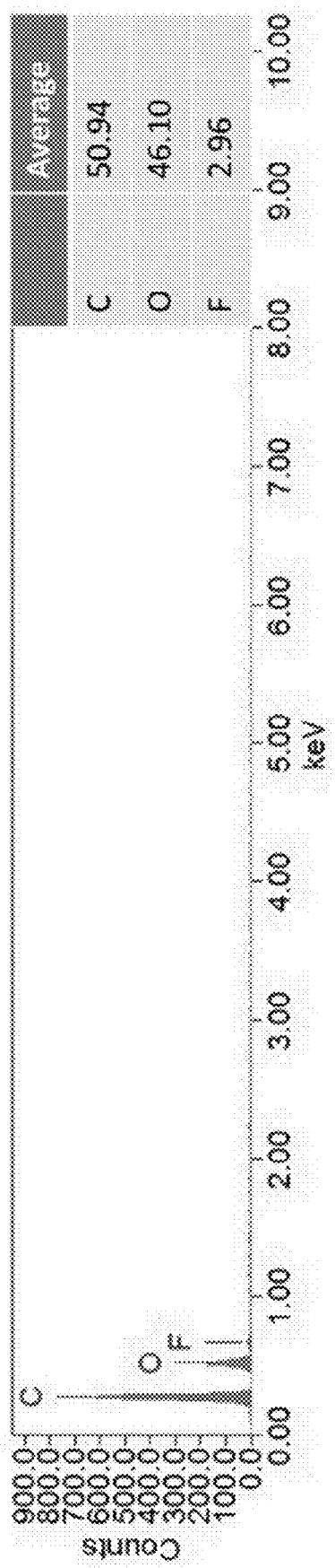
FIG. 2 is an EDX analysis chart showing the proportions of elements contained in flaky graphite obtained in Example 1.
Figure 3:
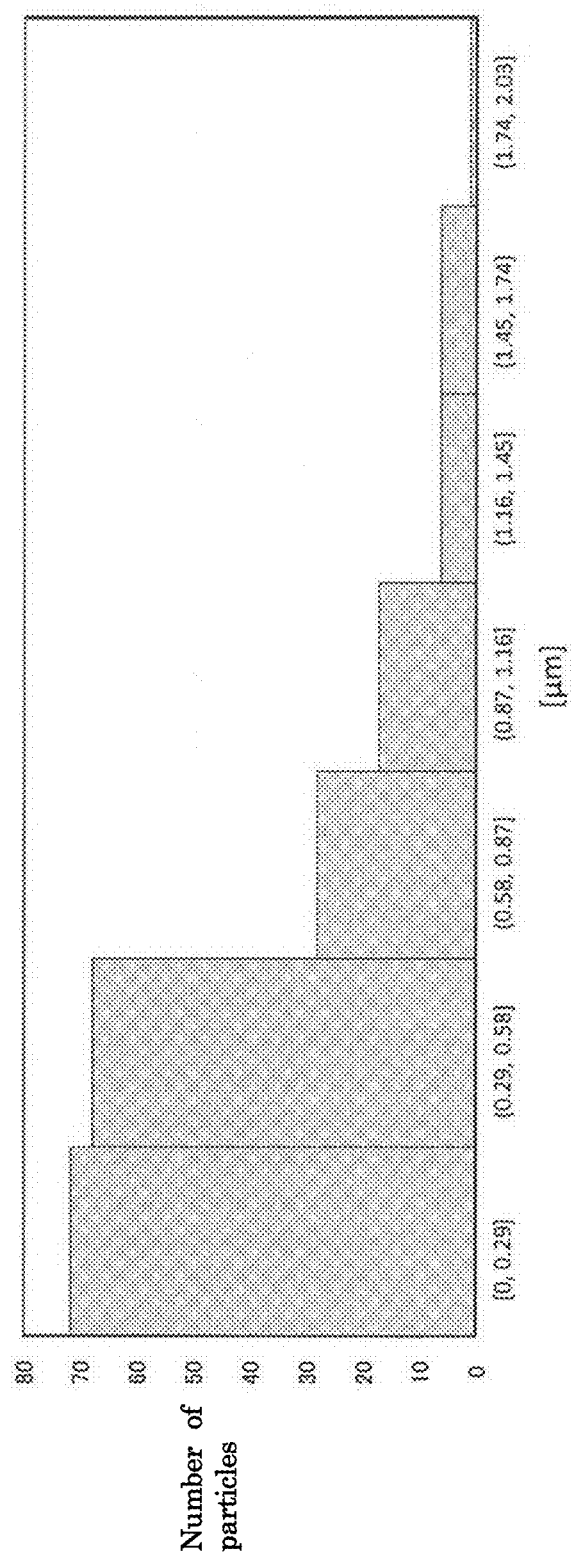
FIG. 3 is a SEM analysis histogram showing the particle size of the flaky graphite obtained in Example 1.
Figure 4:
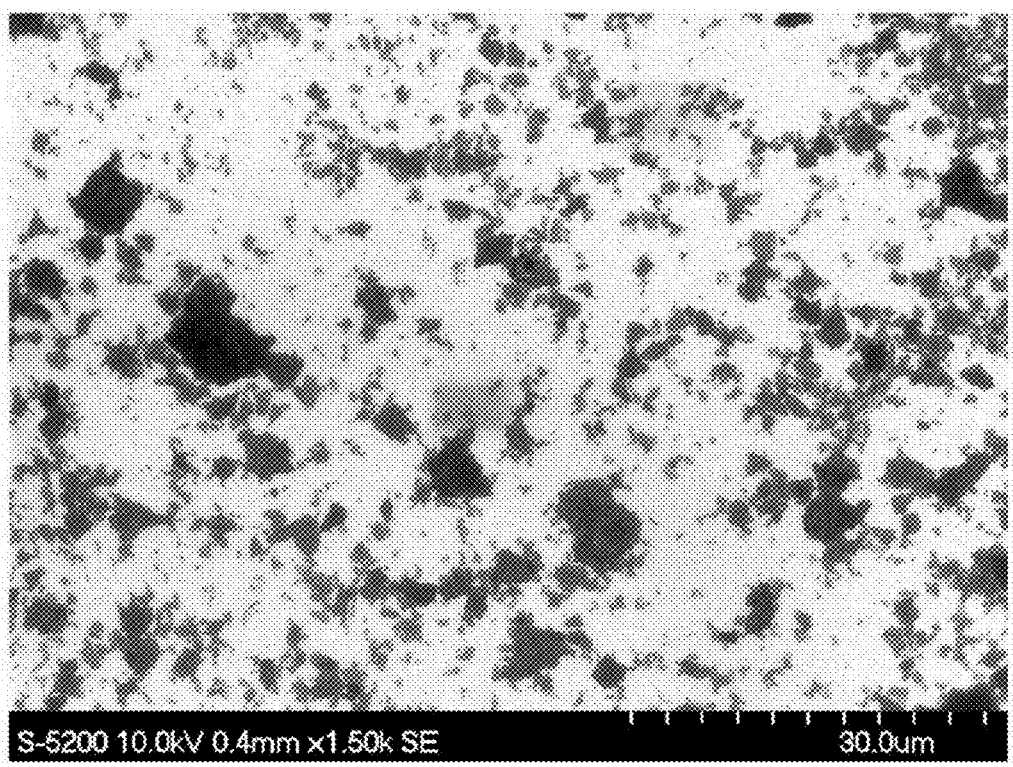
FIG. 4 is a SEM image of the flaky graphite obtained in Example 1.
Figure 5B:
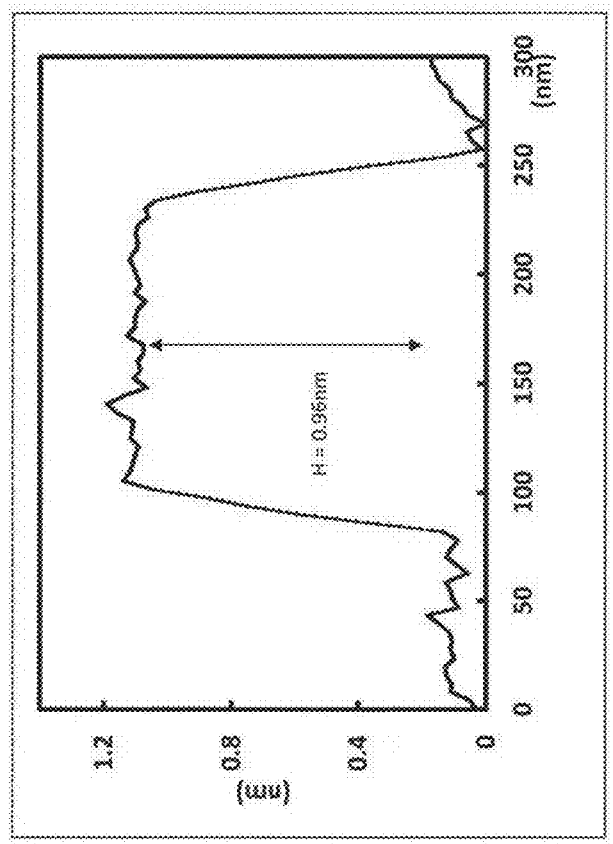
FIG. 5a and FIG. 5b show an AFM analysis result indicating the minimum thickness of the flaky graphite obtained in Example 1.
Figure 5A:
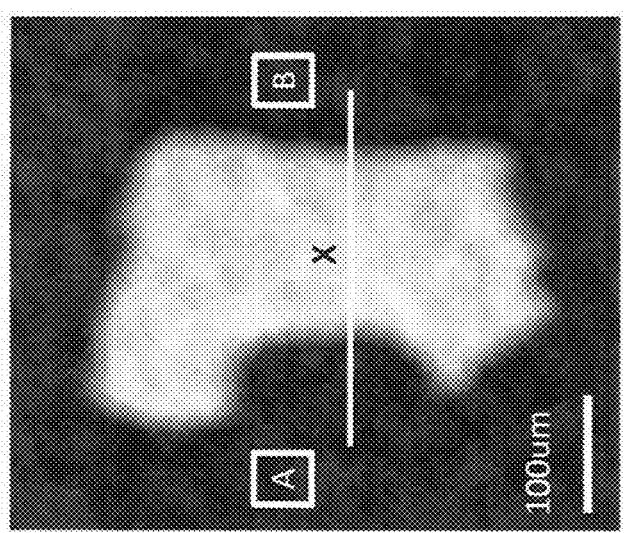

The reacted graphite foil was drawn out of the electrolyte solution and washed with deionized water until the washings became neutral. As a result, an undried, blackish-brown thin plate-shaped graphite product was obtained. A small amount of deionized water was added, and the product was subjected to ultrasonication for 15 minutes followed by freeze-drying to give 110 mg of flaky graphite. The EDX analysis of this material revealed that it consisted of flaky graphite containing oxygen atoms with a carbon/oxygen mass ratio (C/O) of 1.10 and further containing 3 mass % fluorine (FIG. 2). The SEM analysis revealed that the average particle size was 450 nm (FIG. 3) and the maximum particle size was 10 μm (FIG. 4). The AFM analysis revealed that the minimum thickness was 1.0 nm (FIG. 5a and FIG. 5b). The ICP analysis revealed that the manganese content was 0.1 ppm or less and the sulfur content was 0.1 ppm or less.

Example 2

124 mg of flaky graphite was obtained by performing an electrolysis reaction and subsequent procedures under conditions identical to those employed in Example 1, except that 100 ml of a 50% aqueous tetrafluoroboric acid solution was used as the electrolyte solution. The analyses of this material revealed that it consisted of flaky graphite containing oxygen atoms with a carbon/oxygen mass ratio (C/O) of 0.98 and further containing 8 mass % fluorine and that the average particle size was 150 nm, the maximum particle size was 50 μm, and the minimum thickness was 0.8 nm. The ICP analysis revealed that the manganese content was 0.1 ppm or less and the sulfur content was 0.1 ppm or less.

Example 3

154 mg of flaky graphite was obtained by performing an electrolysis reaction and subsequent procedures under conditions identical to those employed in Example 1, except that the current applied in the 10-minute electrolysis was a constant current of 1.0 A. The analysis of this material revealed that it consisted of flaky graphite containing oxygen atoms with a carbon/oxygen mass ratio (C/O) of 1.00 and further containing 8 mass % fluorine. The ICP analysis revealed that the manganese content was 0.1 ppm or less and the sulfur content was 0.1 ppm or less.

Example 4

100 mg of flaky graphite was obtained by performing an electrolysis reaction and subsequent procedures under conditions identical to those employed in Example 1, except that 100 ml of a 20% aqueous hexafluorophosphoric acid solution was used as the electrolyte solution. The element analysis of this material revealed that it consisted of flaky graphite containing oxygen atoms with a carbon/oxygen mass ratio (C/O) of 1.25 and further containing 2 mass % fluorine. The average particle size was 140 nm, the maximum particle size was 35 μm, and the minimum thickness was 0.8 nm. The ICP analysis revealed that the manganese content was 0.1 ppm or less and the sulfur content was 0.1 ppm or less.

Example 5

40 ml of a 50% aqueous tetrafluoroboric acid solution was prepared, and ethanol was added to the solution to a volume of 100 ml. 85 mg of flaky graphite was obtained by performing an electrolysis reaction and subsequent procedures under conditions identical to those employed in Example 1, except that the water/methanol solution of tetrafluoroboric acid was used. The element analysis of this material revealed that it consisted of flaky graphite containing oxygen atoms with a carbon/oxygen mass ratio (C/O) of 1.50 and further containing 10 mass % fluorine. The ICP analysis revealed that the manganese content was 0.1 ppm or less and the sulfur content was 0.1 ppm or less.

Examples 6 to 8

Flaky graphite was obtained by performing an electrolysis reaction and subsequent procedures under conditions identical to those employed in Example 5, except that ethanol was replaced by a polar aprotic solvent listed in Table 1-1. For each example, the amount of the flaky graphite obtained, the carbon/oxygen mass ratio (C/O), the fluorine content, the manganese content, and the sulfur content are shown in Table 1-1.

quent procedures were performed under conditions identical to those employed in Example 1, and thus 95 mg of flaky graphite was obtained. The analyses of this material revealed that it consisted of flaky graphite containing oxygen atoms with a carbon/oxygen mass ratio (C/O) of 3.80 and further

TABLE 1-1

| | | | Example 1 | Example 2 | Example 3 | Example 4 | Example 5 | Example 6 | Example 7 | Example 8 |
|---|---|---|---|---|---|---|---|---|---|---|
| Conditions | Anode | | Graphite foil | Graphite foil | Graphite foil | Graphite foil | Graphite foil | Graphite foil | Graphite foil | Graphite foil |
| | Cathode | | Platinum wire | Platinum wire | Platinum wire | Platinum wire | Platinum wire | Platinum wire | Platinum wire | Platinum wire |
| | Electrolyte solution | | 5% aqueous $HBF_4$ solution | 50% aqueous $HBF_4$ solution | 5% aqueous $HBF_4$ solution | 20% aqueous $HPF_6$ solution | 50% $HBF_4$ solution + ethanol | 50% aqueous $HBF_4$ solution + dimethoxyethane | 50% aqueous $HBF_4$ solution + dimethyl carbonate | 50% aqueous $HBF_4$ solution + acetonitrile |
| Process conditions | Current | A | 0.7 | 0.7 | 1.0 | 0.7 | 0.7 | 0.7 | 0.7 | 0.7 |
| | Electrolysis time | minutes | 10 | 10 | 10 | 10 | 10 | 10 | 10 | 10 |
| Flaky graphite | Form | | Flakes | Flakes | Flakes | Flakes | Flakes | Flakes | Flakes | Flakes |
| | Obtained amount | mg | 110 | 124 | 154 | 100 | 85 | 125 | 110 | 102 |
| | Carbon/oxygen mass ratio (C/O) | | 1.10 | 0.98 | 1.00 | 1.25 | 1.50 | 1.04 | 0.96 | 0.94 |
| | Fluorine content | mass % | 3 | 8 | 8 | 2 | 10 | 6 | 5 | 3 |
| | Average particle size | nm | 450 | 150 | — | 140 | — | — | — | — |
| | Maximum particle size | μm | 10 | 50 | — | 35 | — | — | — | — |
| | Minimum thickness | nm | 1.0 | 0.8 | — | 0.8 | — | — | — | — |
| | Manganese content | ppm | ≤0.1 | ≤0.1 | ≤0.1 | ≤0.1 | ≤0.1 | ≤0.1 | ≤0.1 | ≤0.1 |
| | Sulfur content | ppm | ≤0.1 | ≤0.1 | ≤0.1 | ≤0.1 | ≤0.1 | ≤0.1 | ≤0.1 | ≤0.1 |

Example 9

40 ml of a 5% aqueous tetrafluoroboric acid solution was prepared as the electrolyte solution. A commercially-available sheet made by high-pressure pressing of expanded graphite (PF-HP manufactured by Toyo Carbon Co., Ltd.) was used as the anode and fixed in such a way that a portion of the foil was immersed in the electrolyte solution (the electrolyte solution-immersed portion had an area of 1 cm², which was equivalent to 150 mg of graphite). A platinum wire electrode was set as the cathode. The electrodes were connected to a DC power supply, and electrolysis was carried out at room temperature and a constant current of 0.7 A for 10 minutes. After the reaction, the anode retained the sheet form, while the thickness of the electrolyte solution-immersed portion was obviously greater than before the reaction. This anode was subjected to subsequent procedures under conditions identical to those employed in Example 1, and thus 192 mg of flaky graphite was obtained. The analysis of this material revealed that it consisted of flaky graphite containing oxygen atoms with a carbon/oxygen mass ratio (C/O) of 3.20 and further containing 1.5 mass % fluorine. The ICP analysis revealed that the manganese content was 0.1 ppm or less and the sulfur content was 4 ppm.

Example 10

40 ml of a 5% aqueous tetrafluoroboric acid solution was prepared as the electrolyte solution. A common isotropic graphite sheet was used as the anode and fixed in such a way that a portion of the sheet was immersed in the electrolyte solution (the electrolyte solution-immersed portion had an area of 1 cm², which was equivalent to 125 mg of graphite). A platinum wire electrode was set as the cathode. The electrodes were connected to a DC power supply, and electrolysis was carried out at room temperature and a constant current of 0.7 A for 10 minutes. After that, subsecontaining 1 mass % fluorine and that the average particle size was 180 nm, the maximum particle size was 55 μm, and the minimum thickness was 0.8 nm. The ICP analysis revealed that the manganese content was 0.1 ppm or less and the sulfur content was 0.03 mass % (300 ppm).

Example 11

82 mg of flaky graphite was obtained by performing an electrolysis reaction and subsequent procedures under conditions identical to those employed in Example 1, except that the current application time was changed to 5 minutes. The analysis of this material revealed that it consisted of flaky graphite containing oxygen atoms with a carbon/oxygen mass ratio (C/O) of 3.00 and further containing 2 mass % fluorine. The ICP analysis revealed that the manganese content was 0.1 ppm or less and the sulfur content was 0.1 ppm or less.

Example 12

Figure 6:
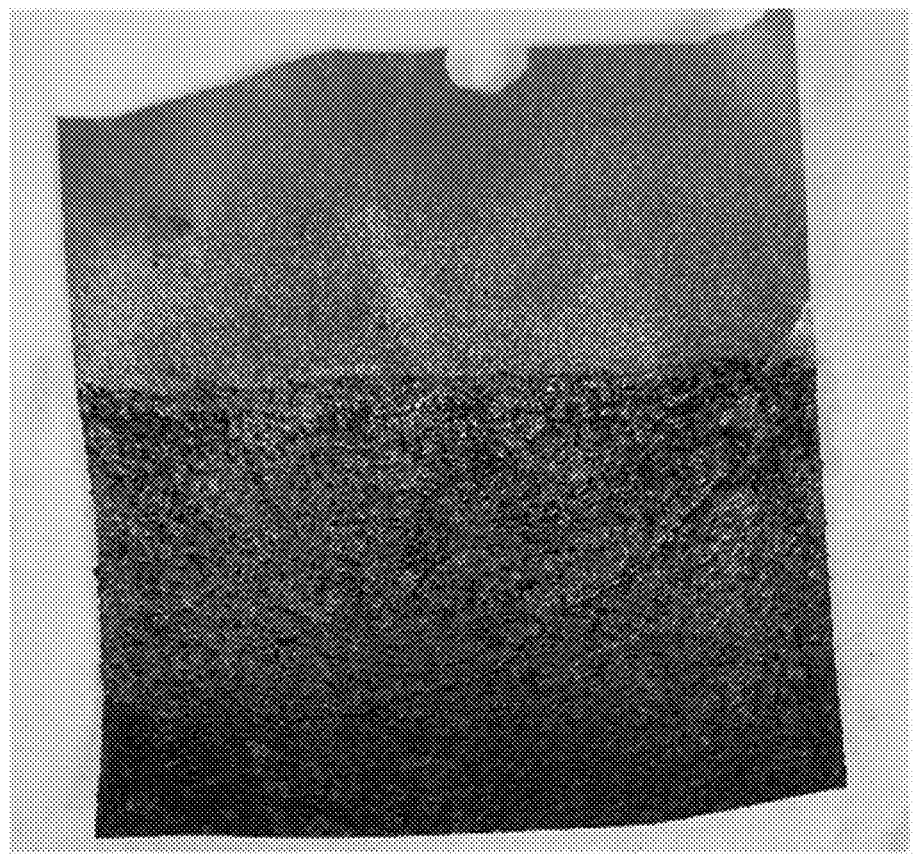
FIG. 6 is a photograph showing the exterior appearance of an as-reacted anode in Example 12.

An electrolysis reaction was performed under conditions identical to those employed in Example 1, except that 100 ml of a 50% aqueous sulfuric acid solution was used as the electrolyte solution. In the course of the reaction, a smooth increase in the thickness of the graphite foil used as the anode was not observed, but instead there was visually observed a phenomenon in which bubbles were significantly generated from the anodic surface and additionally black particulate pieces peeled off from the anodic surface and fell into the electrolyte solution. A photograph of the as-reacted anode is shown in FIG. 6. This result implies that sulfuric acid used as the electrolyte in Example 12 was intercalated between the graphite-constituting layers much more slowly than the electrolyte used in Example 1 and therefore that concentration of the electrical energy on the surface and edge portion of the anode occurred preferentially over the formation of the thin plate-shaped graphite product and induced decomposition of water and the electrolyte. It is inferred that in consequence of the decomposition, oxygen- and sulfur-derived gas components which were collaterally generated caused rapid destruction of the graphite surface texture.

The reacted graphite foil was taken out of the electrolyte solution and washed with deionized water until the washings became neutral. The washed foil was freeze-dried to obtain 36 mg of a black semi-solid material. The analysis of this material revealed that it had a carbon/oxygen mass ratio (C/O) of 13.60.

The above results demonstrate that the method of one or more embodiments of the first aspect of the present invention, which uses tetrafluoroboric acid or hexafluorophosphoric acid as an electrolyte to produce a thin plate-shaped graphite product or flaky graphite through an electrochemical reaction, is considerably superior to other methods using sulfuric acid as the electrolyte in terms of industrial utility, in particular current efficiency, time efficiency, and product quality.

Example 13

Figure 7:
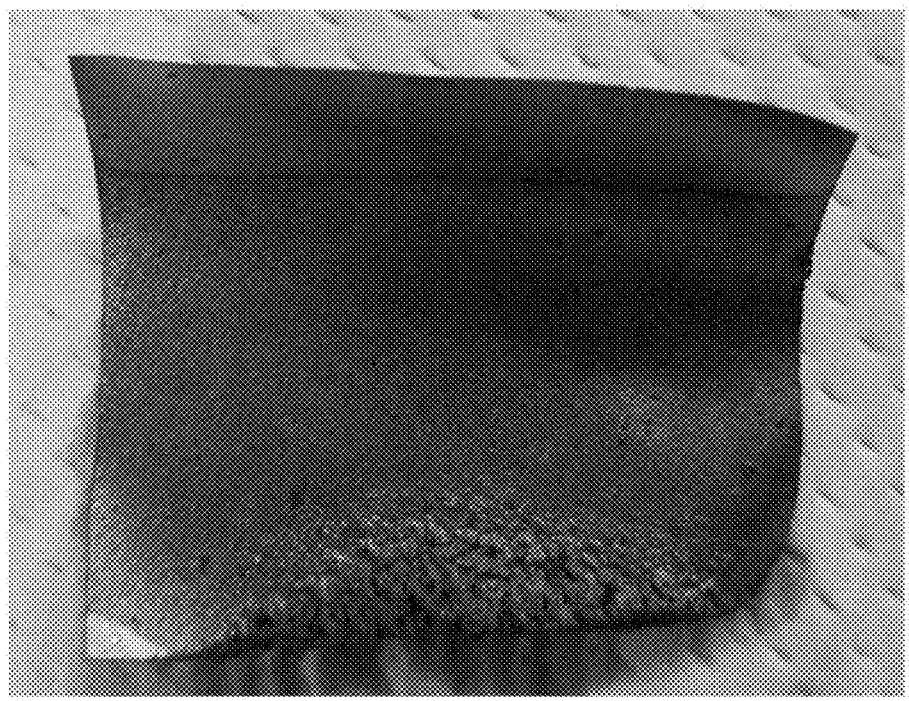
FIG. 7 is a photograph showing the exterior appearance of an as-reacted anode in Example 13.

An electrolysis reaction was performed under conditions identical to those employed in Example 1, except that 100 ml of a 60% aqueous nitric acid solution was used as the electrolyte solution. In the course of the reaction, a smooth increase in the thickness of the graphite foil used as the anode was scarcely observed. Significant generation of bubbles from the surface of the anode and slight expansion of the edge portion of the anode were found already at the beginning of the reaction; however, a major portion of the anode did not show any obvious change in exterior appearance. A photograph of the as-reacted anode is shown in FIG. 7. This result leads to the inference that nitric acid used as the electrolyte in Example 13 was intercalated between the graphite-constituting layers much more slowly than the electrolyte used in Example 1 and therefore the electrical energy concentrated on the surface and edge portion of the anode to induce decomposition of water and the electrolyte, in consequence of which most of the electrolyte solution-contacting portion of the anode remained unchanged from raw graphite while the edge portion slightly expanded.

The reacted graphite foil was taken out of the electrolyte solution and washed with deionized water until the washings became neutral. The washed foil was freeze-dried to obtain 5.7 mg of a black powder material from the edge portion of the anode. The analysis of this material revealed that it had a carbon/oxygen mass ratio (C/O) of 7.80.

The above results demonstrate that the method of one or more embodiments of the first aspect of the present invention, which uses tetrafluoroboric acid or hexafluorophosphoric acid as an electrolyte to produce a thin plate-shaped graphite product or flaky graphite through an electrochemical reaction, is considerably superior to other methods using nitric acid as the electrolyte in terms of industrial utility, in particular current efficiency, time efficiency, and product quality.

Comparative Example 1

An electrolysis reaction was performed under conditions identical to those employed in Example 12, except that a common isotropic graphite sheet was used as the anode. The reacted isotropic graphite sheet was taken out of the electrolyte solution and washed with deionized water until the washings became neutral. The washed sheet was freeze-dried to obtain a black semi-solid material. The analysis of this material revealed that it had a carbon/oxygen mass ratio (C/O) of more than 20. It is seen from this result that the graphite obtained in Example 12 had a higher oxygen content than that obtained in Comparative Example 1.

Comparative Example 2

An electrolysis reaction was performed under conditions identical to those employed in Example 13, except that a common isotropic graphite sheet was used as the anode. The reacted isotropic graphite sheet was taken out of the electrolyte solution and washed with deionized water until the washings became neutral. The washed sheet was freeze-dried to obtain a black semi-solid material. The analysis of this material revealed that it had a carbon/oxygen mass ratio (C/O) of more than 20. It is seen from this result that the graphite obtained in Example 13 had a higher oxygen content than that obtained in Comparative Example 2.

TABLE 1-2

| | | | Example 9 | Example 10 | Example 11 | Example 12 | Example 13 | Comparative Example 1 | Comparative Example 2 |
|---|---|---|---|---|---|---|---|---|---|
| Conditions | Anode | | Expanded graphite | Isotropic graphite | Graphite foil | Graphite foil | Graphite foil | Isotropic graphite | Isotropic graphite |
| | Cathode | | Platinum wire | Platinum wire | Platinum wire | Platinum wire | Platinum wire | Platinum wire | Platinum wire |
| | Electrolyte solution | | 5% aqueous HBF$_4$ solution | 5% aqueous HBF$_4$ solution | 5% aqueous HBF$_4$ solution | 50% aqueous H$_2$SO$_4$ solution | 60% aqueous HNO$_3$ solution | 50% aqueous H$_2$SO$_4$ solution | 60% aqueous HNO$_3$ solution |
| Process conditions | Current | A | 0.7 | 0.7 | 0.7 | 0.7 | 0.7 | 0.7 | 0.7 |
| | Electrolysis time | minutes | 10 | 10 | 5 | 10 | 10 | 10 | 10 |
| Flaky graphite | Form | | Flakes | Flakes | Flakes | Black semi-solid | Black powder | Black semi-solid | Black powder |
| | Obtained amount | mg | 192 | 95 | 82 | 36 | 5.7 | — | — |
| | Carbon/oxygen mass ratio (C/O) | | 3.20 | 3.80 | 3.00 | 13.60 | 7.80 | >20 | >20 |
| | Fluorine content | mass % | 1.5 | 1 | 2 | — | — | — | — |
| | Average particle size | nm | — | 180 | — | — | — | — | — |
| | Maximum particle size | μm | — | 55 | — | — | — | — | — |
| | Minimum thickness | nm | — | 0.8 | — | — | — | — | — |
| | Manganese content | ppm | ≤0.1 | ≤0.1 | ≤0.1 | — | — | — | — |
| | Sulfur content | ppm | 4 | 300 | ≤0.1 | — | — | — | — |

Examples 14 to 16

A commercially-available graphite foil manufactured by Kaneka Corporation (a foil resulting from thermal graphitization of an aromatic polyimide which is a polycondensation polymer compound and having a size of 5 cm×4 cm×20 μm) was used as the anode, a platinum wire electrode was used as the cathode, and a 20% aqueous tetrafluoroboric acid solution (water: 80%), a 20% methanol/water solution of tetrafluoroboric acid (water: 30%, methanol: 50%), or a 20% aqueous sulfuric acid solution (water: 80%) was used as the electrolyte solution. The electrodes were connected to a DC power supply, and electrolysis was carried out at room temperature and a constant current density (180 mA·cm$^{-2}$) for 6 minutes, with the cutoff voltage set to 14 V.

Figure 8A:
FIG. 8a and FIG. 8b are photographs showing the exterior appearance of a graphite foil (EGO$^w$) having undergone electrolysis using an aqueous solution of tetrafluoroboric acid and the exterior appearance of a graphite foil (EGO$^M$) having undergone electrolysis using a methanol/water solution of tetrafluoroboric acid.
Figure 8B:
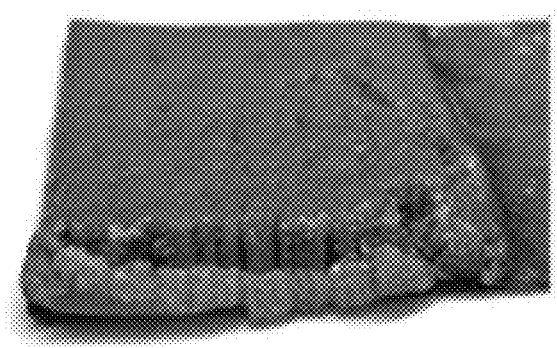

During the electrolysis in the system using tetrafluoroboric acid as the electrolyte, the graphite foil was not destroyed and showed a 400-fold thickness increase from 20 μm to 8 mm. FIG. 8a and FIG. 8b show the exterior appearance of the graphite foil having undergone the electrolysis in the system using tetrafluoroboric acid as the electrolyte. In contrast, in the system using sulfuric acid as the electrolyte, the layers of the graphite peeled off and were destroyed.

The reacted graphite foil was collected by filtration and washed with deionized water until the washings became neutral. As a result, a thin plate-shaped graphite product was obtained. This product was dispersed in water and then subjected to ultrasonication for 30 minutes followed by freeze-drying for 48 hours to obtain flaky graphite.

In the following description, a thin plate-shaped graphite product or flaky graphite obtained using a 20% aqueous tetrafluoroboric acid solution as the electrolyte solution is referred to as "EGO$^W$" (Example 14), a thin plate-shaped graphite product or flaky graphite obtained using a 20% methanol/water solution of tetrafluoroboric acid is referred to as "EGO$^M$" (Example 15), and a thin plate-shaped graphite product or flaky graphite obtained using a 20% aqueous sulfuric acid solution is referred to as "EGO S" (Example 16).

LSV

Figure 9:
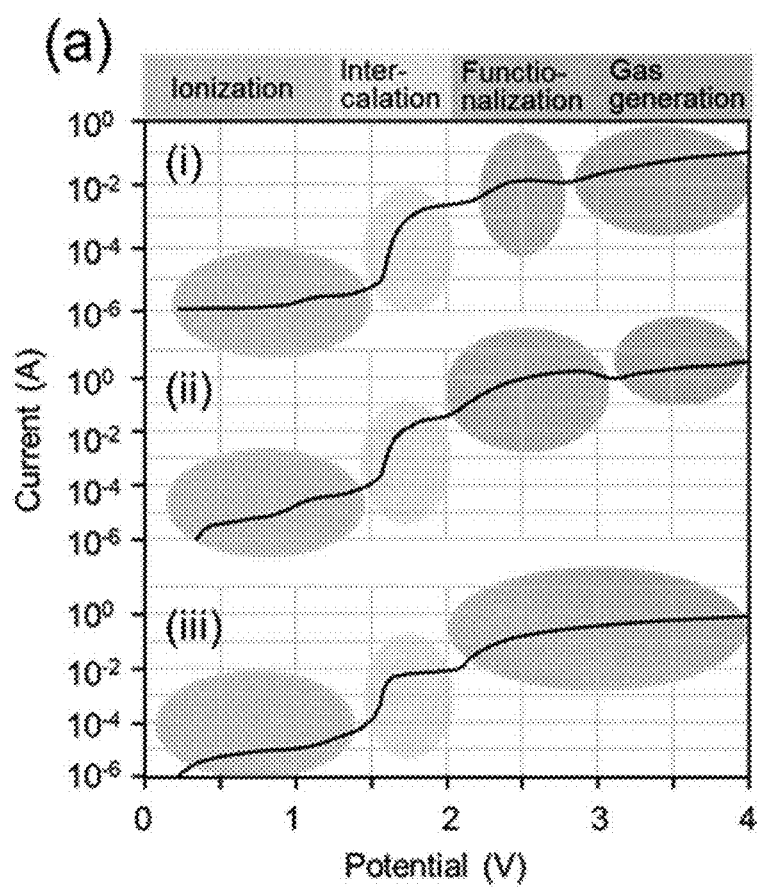
FIG. 9 shows results of linear scan voltammetry (LSV) performed for systems for production of EGO$^W$ (curve (i)), EGO$^M$ (curve (ii)), and EGO S (an electrolysis reaction using an aqueous solution of sulfuric acid; curve (iii)).

The systems for producing the EGO materials were subjected to linear scan voltammetry (LSV) under the conditions as previously described. The results are shown in FIG. 9. The LSV curve of EGO$^W$ (curve (i) in FIG. 9) shows four continuous reaction stages. The four stages include graphite ionization at 0.3 to 1.6 V, intercalation at 1.7 V, functionalization at 2.2 to 2.7 V, and gas generation in a voltage range above 2.7 V.

For the LSV curve of EGO$^M$ (curve (ii) in FIG. 9), the voltages at which ionization and intercalation proceeded were the same as those for EGO$^W$. However, the voltage range over which functionalization proceeded was wider and in particular from 2.0 to 3.0 V, and gas generation did not occur until the voltage increased above 3.0 V.

In contrast to the above two LSV curves, the LSV curve of EGO S (curve (iii) in FIG. 9) shows only three reaction stages. The three stages include ionization at 0.5 to 1.5 V, intercalation at 1.6 V, and gas generation in a voltage range above 2.0 V. The absence of the functionalization reaction reflects the fact that decomposition of HSO$^{4-}$ ions into gas competed with the intercalation of the ions and thus the layers of the graphite were destroyed before completion of oxidation.

For EGO$^M$ and EGO$^W$, synthesis of the flaky graphite was accomplished by non-destructive intercalation, and this led to an unexpected phenomenon, in particular oxidation of the graphite foil outside the electrolyte solution. First, in the period from 0 to 5 minutes, the intercalation and functionalization proceeded. The graphite foil in the electrolyte solution underwent the intercalation, which immediately increased the thickness of the graphite foil. Finally, the thickness increase reached into the upper portion of the graphite foil which was outside the electrolyte solution. This phenomenon is due to capillary absorption of the electrolyte solution by the layers of the graphite during the intercalation and functionalization, and was not observed for EGO$^S$.

Influences of Electrolysis Time, Current Density, and Concentration

Subsequently, CHN element analysis was conducted to determine the carbon/oxygen mass ratio (C/O) of each of the EGO materials produced under different electrolysis conditions and thereby evaluate the degree of functionalization of each EGO material.

Figure 10A:
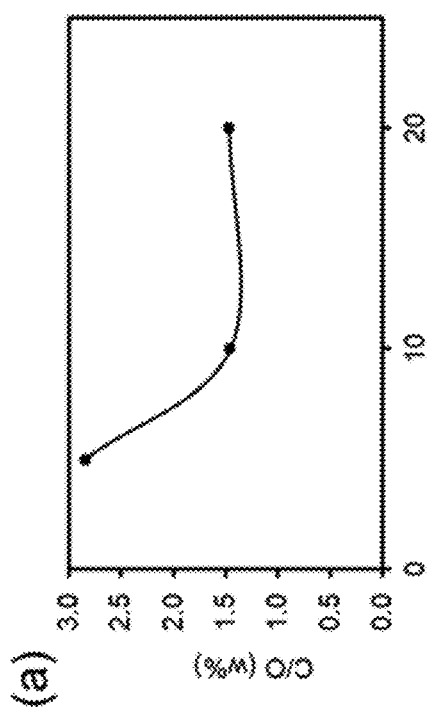
FIG. 10a, FIG. 10b, and FIG. 10c respectively show the relationships of the electrolysis time, current density, and tetrafluoroboric acid concentration with the C/O of the resulting product in EGO$^W$ synthesis.

The influence of the electrolysis time on the EGO$^W$ synthesis at a constant current will first be discussed. As seen from FIG. 10(a), an increase in electrolysis time from 5 to 10 minutes resulted in a decrease in C/O from 2.85 to 1.46. However, a further increase in electrolysis time did not give rise to further oxidation.

Figure 10B:
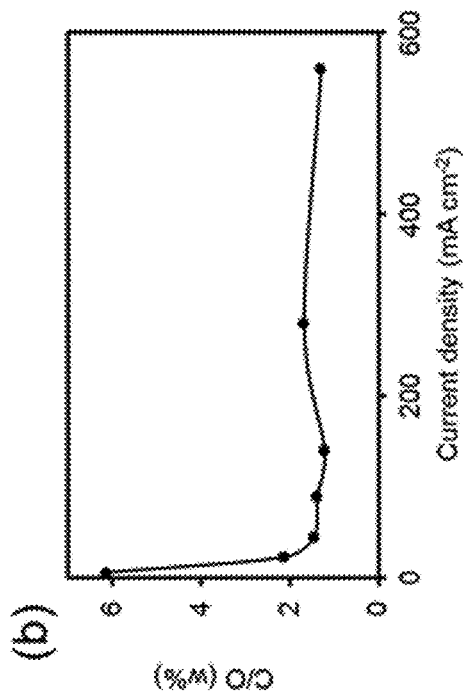

As for the influence of the current density on the EGO$^W$ synthesis, an increase in current density from 6 to 90 mA·cm$^2$ resulted in a decrease in C/O from 6.14 to 1.38 as seen from FIG. 10(b). Increasing the current density above 180 mA·cm$^{-2}$ did not provide any evident improvement. The current density is desirably 180 mA·cm$^{-2}$ in order to enhance the production rate of EGO$^W$.

Figure 10C:
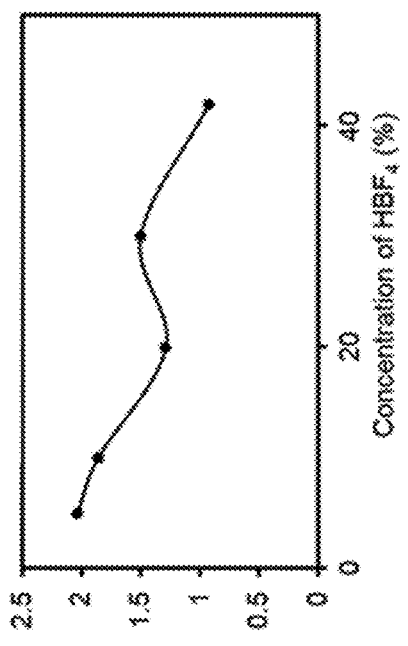

The influence of the tetrafluoroboric acid concentration on the EGO$^W$ synthesis will next be discussed. As seen from FIG. 10(c), the best result was obtained at a tetrafluoroboric acid concentration of 42%, and in this case the C/O was 0.99. An increase in water content of the electrolyte solution was accompanied by an increase in C/O. This can be explained by a decrease in the amount of intercalated BF$^{4-}$ ions and an increase in the amount of gas generated due to water decomposition.

Figure 10D:
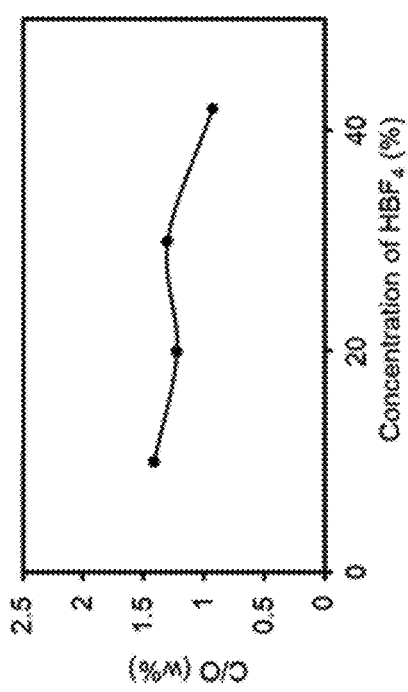
FIG. 10d shows the relationship of tetrafluoroboric acid concentration with the C/O of the resulting product in EGO$^M$ synthesis.

As seen from FIG. 10(d), the same trend was observed for EGO$^M$; specifically, an increase in tetrafluoroboric acid concentration resulted in a decrease in C/O. However, the C/O at a tetrafluoroboric acid concentration of 10% was 1.82 for EGO$^W$ and 1.42 for EGO$^M$. This implies that the presence of methanol reduced the gas generation and the destruction of the graphite foil and brought about uniform and complete functionalization.

The samples used in the procedures described below were those prepared under the optimum conditions. Specifically, for EGO$^W$, the best-suited electrolyte solution is one containing 42% tetrafluoroboric acid and 58% water. A sample prepared using this electrolyte solution will be referred to as "EGO$^W$-42%". For EGO$^M$, the best-suited electrolyte solution is one containing 20% tetrafluoroboric acid, 30% water, and 50% methanol. A sample prepared using this electrolyte solution will be referred to as "EGO$^M$-20%".

Comparative Example: Preparation of CGO 3.0 g of natural graphite flakes were added to 75 mL of 95% sulfuric acid, and 9.0 g of KMnO$_4$ was further added slowly at a controlled temperature below 10° C. The resulting mixture was stirred at 35° C. for 2 hours. While the mixture was further stirred vigorously, the mixture was diluted with 75 mL of water. This dilution was conducted under cooling such that the temperature of the mixture did not exceed 50° C. The resulting suspension was treated with 7.5 mL of a 30% aqueous H$_2$O$_2$ solution. The resulting graphite oxide suspension was purified with water by centrifugation until the suspension became neutral. The purification was followed by freeze-drying to obtain CGO. Highly-oxidized CGO (HCGO) was produced by performing the procedures as described above using CGO instead of natural graphite.

XPS

Figure 11:
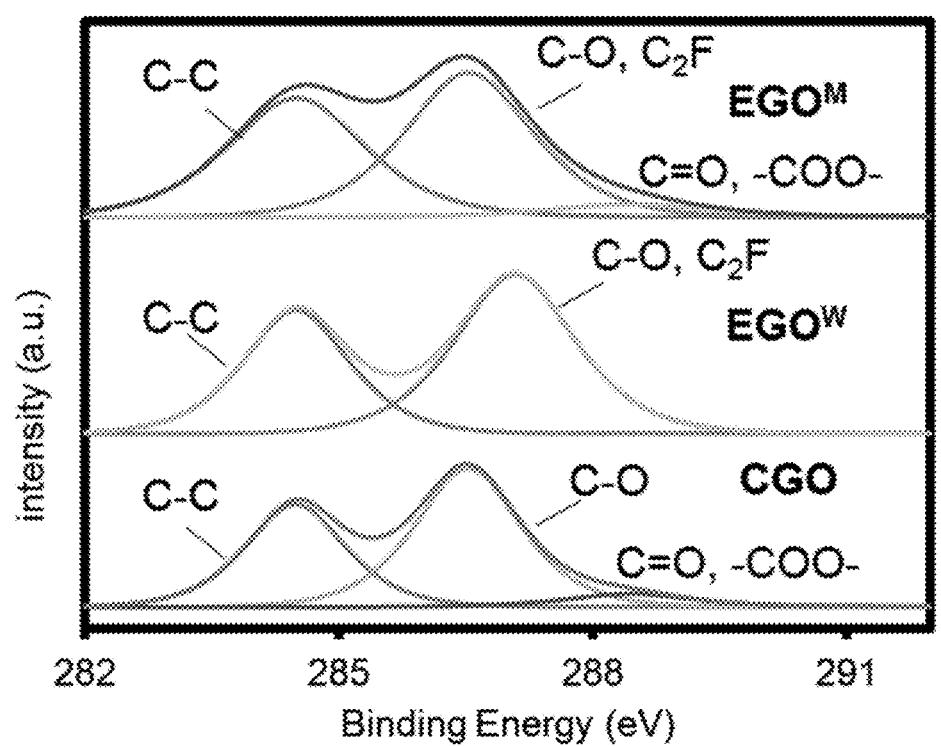
FIG. 11 shows a chart obtained through X-ray photoelectron spectroscopy of EGO$^M$, EGO$^W$, and CGO (chemically synthesized graphene oxide).
Figure 14A:
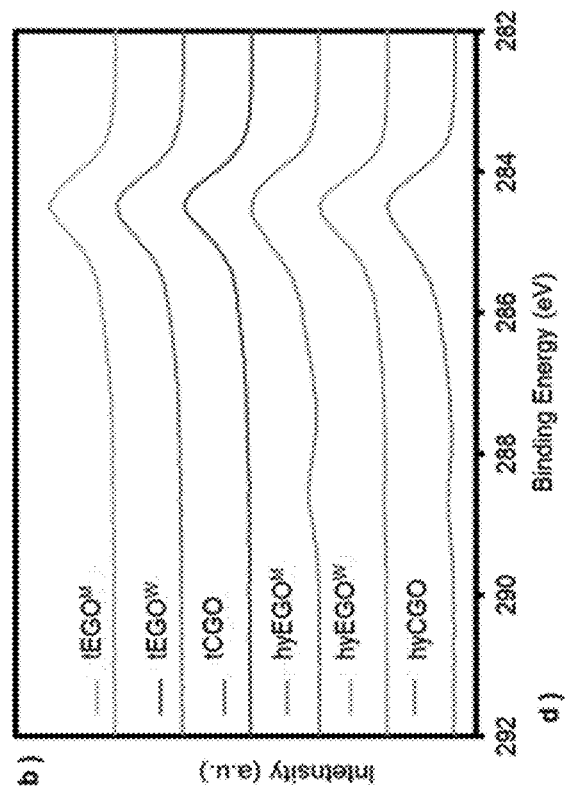
FIG. 14a shows XRD patterns measured for EGO$^M$, EGO$^W$, and CGO having undergone reduction (thermal reduction t or chemical reduction hy)
Figure 14B:
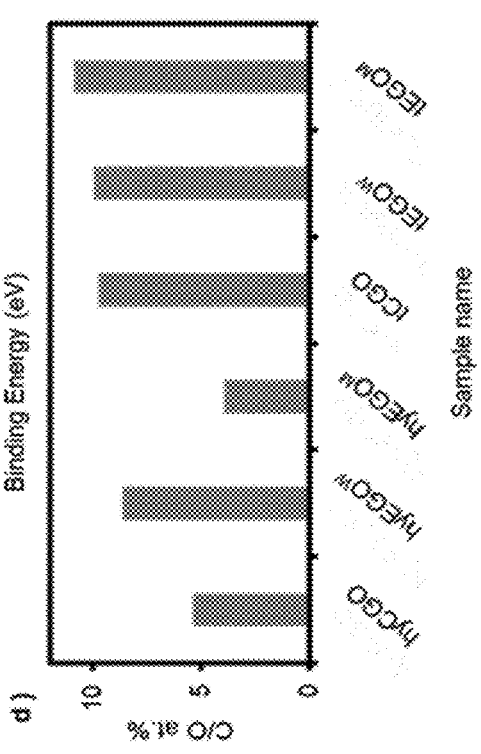
FIG. 14b shows XPS C1s patterns.
Figure 14C:
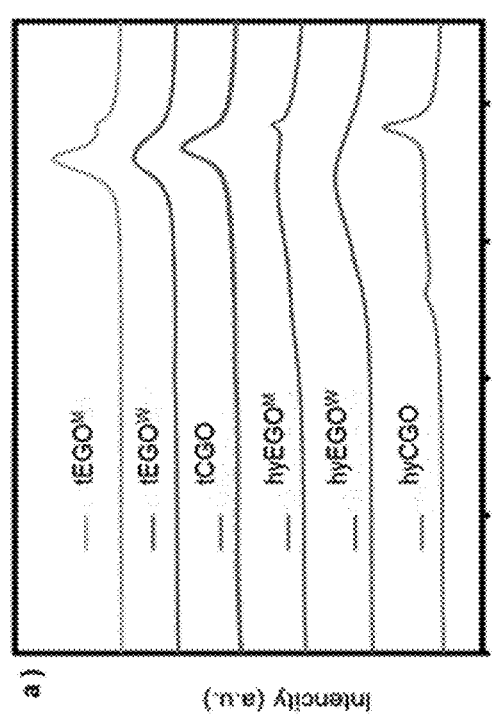
FIG. 14c shows results of interlayer distance determination.
Figure 14D:
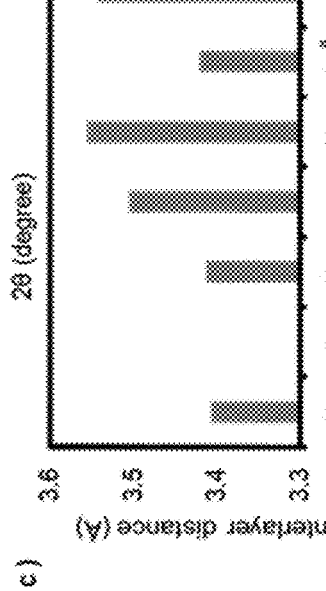
FIG. 14d shows results of XPS atomic composition analysis.

X-ray photoelectron spectroscopy (XPS) was used to identify the atomic compositions of the surfaces of the as-produced samples. The XPS was performed using JPS-9030 at a pass energy of 20 eV. The results are shown in FIG. 11 and Table 2. All the samples showed C-1s and O-1s peaks, and each EGO sample further showed a small F-1s peak. For $EGO^W$-42%, the oxygen content was 34.2 wt % and the carbon/oxygen mass ratio (C/O) was 1.8. For $EGO^M$-20%, the oxygen content was 35.2 wt % and the C/O was 1.7. For CGO, the oxygen content was 40.5 wt %.

For $EGO^M$ and CGO, the peak at around 288 to 289 eV attributed to C=O and —COO— was observed, while for $EGO^W$ this peak was not observed. The ratio of the height of the peak at a binding energy of around 288 to 289 eV to the height of the peak at a binding energy of around 284 to 285 eV was 0.09 for $EGO^M$ and 0 for $EGO^W$.

TABLE 2

| | CGO | $EGO^W$-42% | $EGO^M$-20% |
|---|---|---|---|
| C (at %) | 63.4 | 69.6 | 68.1 |
| O (at %) | 34.8 | 28.4 | 29.4 |
| S (at %) | 1.8 | — | — |
| F (at %) | — | 2 | 2.5 |

XRD

FIG. 12a shows XRD patterns of $EGO^W$-42%, $EGO^M$-20%, and CGO (Comparative Example). The XRD was measured in a 2θ range of 5 to 75° using X' part PRO (PANalytical Co.) which employs Cu-Kα radiation (λ=1, 541 Å). The result was that $EGO^M$ and CGO exhibited similar patterns and that for $EGO^W$ the GO(002) diffraction peak was shifted to a greater angle. This result indicates that the inter-sheet distance of $EGO^W$ was smaller than those of $EGO^M$ and CGO.

FIG. 12b shows Lambert-Beer coefficients at 660 nm. Plotted in this figure is a value obtained by measuring the absorbance at 660 nm using V-670 spectrophotometer (JASCO) and dividing the measured absorbance by the cell length. The coefficient was 109.0 Lg$^{-1}$m$^{-1}$ for $EGO^W$-42%, 586.5 Lg$^{-1}$m$^{-1}$ for $EGO^M$-20%, 65.9 Lg$^{-1}$m$^{-1}$ for CGO, and 39.7 Lg$^{-1}$m$^{-1}$ for highly-oxidized CGO (HCGO). This result reveals that the degree of destruction of the conjugated electron structure was smaller in EGO than in CGO and that the conjugated electron structure of $EGO^M$ is more continuous than that of $EGO^W$.

FIG. 12c shows results of Raman spectroscopy. The Raman spectra were measured using T-64000 (Horiba Jobin Yvon Inc.). Before the electrolysis, the graphite foil exhibited strong G- and 2D-band peaks at 1578 cm$^{-1}$ and 2714 cm$^{-1}$. After the electrolysis, a D-band peak additionally appeared at 1360 cm$^{-1}$.

FIG. 12d shows results of FT-IR analysis. The FT-IR spectra were measured using IR Tracer 100 (SHIMADZU). The samples showed similar spectrum patterns indicating O—H stretching vibration (3420 cm$^{-1}$), C=O stretching vibration (1720 to 1740 cm$^{-1}$), C=C stretching vibration (1590 to 1620 cm$^{-1}$), and C—O vibration (1250 to 1000 cm$^{-1}$). In addition, $EGO^M$-20% showed a band characteristic of methoxy groups (2976, 1467, and 1056 cm$^{-1}$).

For $EGO^M$-20% and $EGO^W$-42%, the peak attributed to O—H stretching vibration (3420 cm$^{-1}$) was sharper than for CGO. The width at half maximum of this peak was 334 cm$^{-1}$ for $EGO^M$-20%, 257 cm$^{-1}$ for $EGO^W$-42%, and 1115 cm$^{-1}$ for CGO.

For $EGO^M$-20%, the peak attributed to C=O stretching vibration (1720 to 1740 cm$^{-1}$) was stronger than for $EGO^W$-42%. The ratio of the height of the peak at a wavelength of around 1720 to 1740 cm$^{-1}$ to the height of the peak at a wavelength of around 1590 to 1620 cm$^{-1}$ was 0.58 for $EGO^M$-20% and 0.19 for $EGO^W$-42%.

FIG. 12e) shows results of solid $^{13}$C NMR. The solid $^{13}$C NMR spectra were measured using an NMR system (an 11.7T magnet and a DD2 spectrometer; Agilent Technology Inc.) with the magic angle spinning (MAS) set to 10 kHz. For each EGO material, the presence of epoxy (60 ppm), hydroxy (72 ppm), and carboxyl (168 ppm) groups was observed. $EGO^M$-20% further showed the presence of alkyl (16 ppm), fluorine (85 ppm), and alkoxide (60 ppm) groups.

For CGO, the peak attributed to hydroxy groups (72 ppm) was strong, while for $EGO^M$-20% and $EGO^W$-42%, this peak was hardly observed. Specifically, the ratio of the height of the peak at a chemical shift of around 70 ppm to the height of the peak at a chemical shift of around 130 ppm was 1.3 for CGO, while this ratio was 0.43 for $EGO^M$-20% and 0.38 for $EGO^W$-42%.

Additionally, the peak attributed to epoxy or alkoxide groups (60 ppm) was weaker for $EGO^W$-42% than for $EGO^M$-20%. Specifically, the ratio of the height of the peak at a chemical shift of around 60 ppm to the height of the peak at a chemical shift of around 70 ppm was 1.5 for $EGO^W$-42% and 3.1 for $EGO^M$-20%.

The functional groups contained in the GO materials can be removed by thermal treatment. CGO releases carbon monoxide, carbon dioxide, and water typically at 130 to 200° C. FIG. 12f) shows results of TGA-MS of the GO materials. The TGA was conducted using TG 8121 (RIGAKU). The results of TGA-MS show that $EGO^W$-42% released hydrogen fluoride at 200° C. and 320° C. and $EGO^M$-20% released hydrogen fluoride and methane at 200° C. and 320° C. These results support the fact that $EGO^W$-42% contained fluorine and $EGO^M$-20% contained fluorine and further contained methoxy and/or methyl groups.

FIGS. 13(a) and 13(b) show results of scanning electron microscopy (SEM). For the SEM analysis, each EGO material was deposited on an SiO$_2$/Si substrate. The longitudinal size distribution as calculated using 100 or more EGO flakes was 0.45±0.03 μm (0.04 to 1.78 μm) for $EGO^W$-42% and 0.12±0.01 μm (0.031 to 0.363 μm) for $EGO^M$-20%.

FIGS. 13(c) and 13(d) show results of atomic force microscopy (AFM) performed using SPM-9700 HT (SHIMADZU). For the AFM analysis, each EGO material was deposited on a mica substrate by spin coating. The analysis of 100 or more EGO flakes revealed that the average thickness of the flakes was 1.36 nm for $EGO^W$-42% and 1.27 nm for $EGO^M$-20%. It was also found that 62% or more of the $EGO^W$-42% sheets consisted of a single layer (<1.5 nm) and 95% or more of the $EGO^W$-42% sheets consisted of a single or two layers (up to 2 nm) and that 88% or more of the $EGO^M$-20% sheets consisted of a single layer (<1.5 nm) and 97% or more of the $EGO^M$-20% sheets consisted of a single or two layers (up to 2 nm).

FIGS. 13(e) to 13(j) show results of evaluation of the dispersibility of the as-prepared EGO and CGO. Each freeze-dried GO material was dispersed in water or methanol at a concentration of 0.33 mgmL$^{-1}$. All the materials were well dispersed in water and exhibited the properties of a nematic liquid crystal for at least two months (FIGS. 13(e) to 13(g) are photographs of the post-two-month states). In contrast, in methanol, $EGO^W$-42% and CGO were aggregated after one week (FIGS. 13(h) and 13(i) are photographs of the post-one-week states). Only $EGO^M$-20% remained dispersed after one week (FIG. 13(j) is a photograph of the post-one-week state). This demonstrates that $EGO^M$-20% had high affinity for methanol.

Post-Reduction Properties

EGO and CGO were subjected to chemical reduction and thermal reduction. In the chemical reduction, the as-prepared GO material was dispersed in water, then 0.4 $mLg^{-1}$ of hydrazine was added, and thereafter the resulting solution was heated at 90° C. for 2 hours. Thermal reduction was carried out by holding the material in an oven at 220° C. for 2 hours and then at 600° C. for 1 hour. In both cases, the resulting product was dispersed in water, collected by filtration through filter paper, and then compressed into a palette. $EGO^W$, $EGO^M$, and CGO reduced with hydrazine will be referred to as "$hyEGO^W$", "$hyEGO^M$", and "hyCGO", respectively. $EGO^W$, $EGO^M$, and CGO reduced thermally will be referred to as "$tEGO^W$", "$tEGO^M$", and "tCGO", respectively.

FIGS. 14(a), 14(b), 14(c), and 14(d) respectively show XRD analysis results, XPS C1s analysis results, interlayer distance determination results, and XPS atomic composition analysis results obtained for the reduced GO materials. In the XRD, all the reduced GO materials displayed a diffraction peak shift to a greater angle. This shift is due to removal of functional groups from the graphene surface, and the functional group removal can be seen also from the XPS results.

Figure 15:
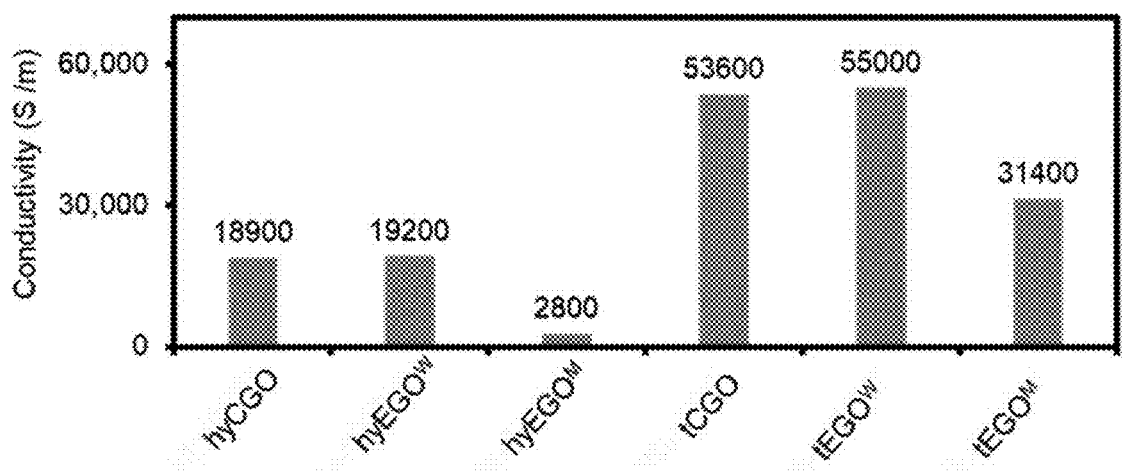
FIG. 15 shows results of conductivity measurement for EGO$^M$, EGO$^W$, and CGO having undergone reduction (chemical reduction hy or thermal reduction t).

FIG. 15 shows results of conductivity measurement performed for the reduced GO materials by a four-terminal method. These results prove that thermal reduction has a greater conductivity-improving effect than the chemical reduction and that the effect of the reduction is especially significant for $EGO^M$.

Use as Negative Electrode of Lithium-Ion Battery

Each tGO material was used as an active material for a negative electrode of a lithium-ion battery. First, EGO or CGO was heated at 650° C. under $N_2$ atmosphere to obtain tEGO or tCGO. A negative electrode was made using tEGO, tCGO, or graphite as an active material, acetylene black as a conductive additive, polyvinylidene fluoride as a binder, N-methyl-2-pyrrolidone as a solvent, and a copper foil as a current collector. The active material:conductive additive: binder weight ratio was 7:2:1. A CR2032 coin cell battery was assembled using metallic lithium as a positive electrode and Whatman 1823-257 as a separator. The electrolyte solution used was a 1 $ML_{-1}$ solution of $LiPF_6$ in an ethylene carbonate (EC)-diethyl carbonate (DEC) mixture having an EC:DEC volume ratio of 3:7.

For each lithium-ion battery obtained, a charge-discharge cycling test was performed using a multi-channel battery tester (580 8 channel Battery Cycler) at a potential window of 0.01 to 3 V. The results are shown in FIG. 16 a). The batteries made using $tEGO^W$, $tEGO^M$, and tCGO exhibited similar performance, which was higher than that of the battery made using graphite. The capacity at a current density of 372 $mAg^{-1}$ was 495 $mAhg^{-1}$ for $tEGO^W$, 554 $mAhg^{-1}$ for $tEGO^M$, and 513 $mAhg^{-1}$ for tCGO. The capacity at a current density of 7440 $mAg^{-1}$ was 163 $mAhg^{-1}$ for $tEGO^W$, 195 $mAhg^{-1}$ for $tEGO^M$, and 176 $mAhg^{-1}$ for tCGO.

Use as Filtration Membrane

To make effective use of the two-dimensional form of EGO, thin EGO membranes were made through the following procedures. First, each GO powder material was dispersed in deionized water at a concentration of 0.1 mg/mL, and the dispersion was centrifuged twice at 6000 rpm for 5 minutes to remove the precipitate. Subsequently, 6 mL of the resulting GO solution was filtered through a polycarbonate membrane, and the filtration was followed by drying at room temperature for 1 day to give a thin membrane.

Figures 16A, 16B:
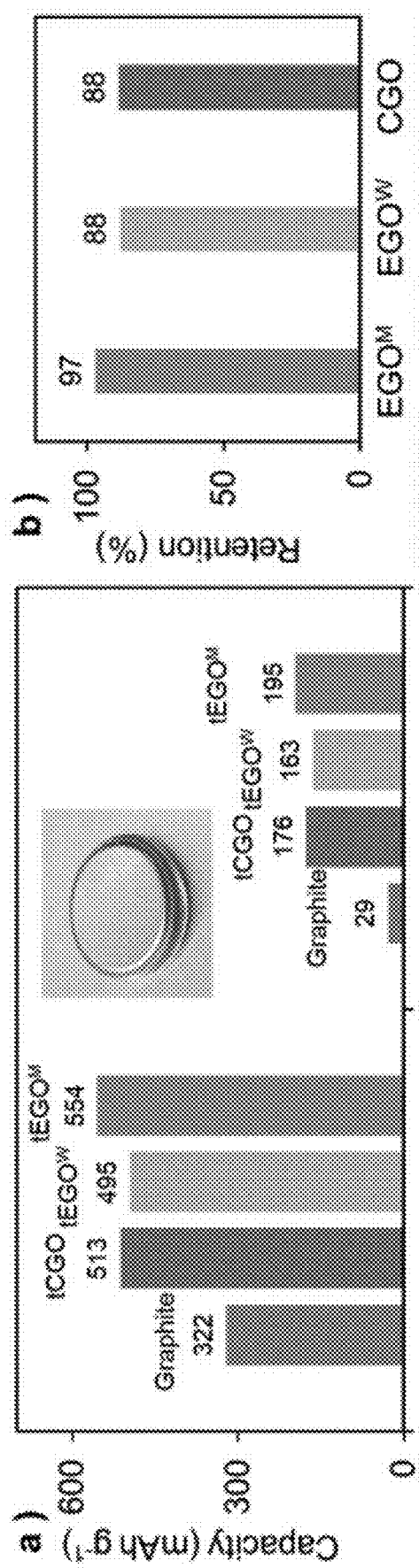
FIG. 16a shows results of capacity measurement for lithium-ion batteries in which graphite, thermally reduced CGO, thermally reduced EGO$^W$, or thermally reduced EGO$^M$ was used as an electrode active material.
FIG. 16b shows results of measurement of the dye molecule retention of filtration membranes made using EGO$^M$, EGO$^W$, and CGO.

For the thin membranes obtained as above, the retention of dye molecules (10 $\mu gmL^{-1}$ methyl orange) was evaluated at 35 $kgfcm^{-2}$ and a flow rate of 0.1 $mLmin^{-1}$. The results are shown in FIG. 16b). The membrane made using $EGO^W$-42% removed 88% of the methyl orange molecules, and the membrane made using $EGO^M$-20% removed 97% of the methyl orange molecules. This performance result was comparable to that obtained for the membrane made using CGO.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

The invention claimed is:

1. A method of producing a thin plate-shaped graphite product, comprising applying a current to an electrochemical reaction system,
   wherein the electrochemical reaction system includes:
      a graphite-containing anode;
      a cathode optionally containing graphite; and
      an electrolyte solution containing tetrafluoroboric acid or hexafluorophosphoric acid as an electrolyte.

2. The method according to claim 1, wherein tetrafluoroboric acid anions or hexafluorophosphoric acid anions are intercalated between layers constituting graphite of the anode to obtain the thin plate-shaped graphite product.

3. The method according to claim 1, wherein the graphite-containing anode is an anode made by thermal treatment of a polycondensation polymer compound.

4. The method according to claim 3, wherein the graphite-containing anode is an anode made by thermal treatment of an aromatic polyimide.

5. The method according to claim 1, wherein the graphite-containing anode is an anode made by pressing of expanded graphite resulting from immersion of natural graphite in a strong acid and subsequent heating treatment of the natural graphite.

6. The method according to claim 1, wherein the electrolyte solution contains a polar protic solvent or a polar aprotic solvent.

7. The method according to claim 1, wherein the electrolyte solution contains water and a polar aprotic solvent.

8. The method according to claim 1, wherein the electrolyte solution contains a solvent consisting of water.

9. The method according to claim 1, wherein the electrolyte solution contains water and a polar protic solvent other than water.

10. The method according to claim 9, wherein the polar protic solvent other than water is an alcoholic solvent.

11. A method of producing flaky graphite, comprising:
   obtaining a thin plate-shaped graphite product by the method according to claim 1; and
   subjecting the thin plate-shaped graphite product to delamination to obtain the flaky graphite.

12. The method according to claim 11, wherein the delamination is delamination by ultrasonication, mechanical delamination, or delamination by heating.

13. The method according to claim 11, wherein the flaky graphite has a thickness of 100 nm or less.

14. The method according to claim 11, wherein the flaky graphite contains oxygen.

15. The method according to claim 14, wherein the flaky graphite has a carbon/oxygen mass ratio (C/O) of 20 or less.

16. The method according to claim 14, wherein the flaky graphite further contains fluorine.

* * * * *